United States Patent
Bund et al.

(10) Patent No.: US 9,983,366 B2
(45) Date of Patent: May 29, 2018

(54) FIELD INSTALLED OPTICAL FIBER CONNECTOR FOR JACKETED FIBER CABLE AND TERMINATION METHOD

(71) Applicant: 3M INNOVATIVE PROPERTIES COMPANY, St. Paul, MN (US)

(72) Inventors: Christine B. Bund, Wuppertal (DE); Donald K. Larson, Cedar Park, TX (US); Wesley A. Raider, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/522,183

(22) PCT Filed: Oct. 29, 2015

(86) PCT No.: PCT/US2015/058022
§ 371 (c)(1),
(2) Date: Apr. 26, 2017

(87) PCT Pub. No.: WO2016/073273
PCT Pub. Date: May 12, 2016

(65) Prior Publication Data
US 2017/0336576 A1    Nov. 23, 2017

Related U.S. Application Data

(60) Provisional application No. 62/087,327, filed on Dec. 4, 2014, provisional application No. 62/074,762, filed on Nov. 4, 2014.

(51) Int. Cl.
*G02B 6/36* (2006.01)
*G02B 6/38* (2006.01)

(52) U.S. Cl.
CPC ......... *G02B 6/3887* (2013.01); *G02B 6/3801* (2013.01); *G02B 6/3806* (2013.01);
(Continued)

(58) Field of Classification Search
CPC .. G02B 6/3846; G02B 6/3861; G02B 6/3869; G02B 6/3887; H01R 13/56; H01R 13/562
(Continued)

(56) References Cited

U.S. PATENT DOCUMENTS 4,824,197 A   4/1989 Patterson
5,102,212 A   4/1992 Patterson
(Continued)

FOREIGN PATENT DOCUMENTS

JP    3445479      9/2003
JP    2004-210251  7/2004
(Continued)

OTHER PUBLICATIONS

International Search Report for PCT International Application No. PCT/US2015/058022, dated May 2, 2016, 8 pages.

*Primary Examiner* — Jerry Rahll
*Assistant Examiner* — Michael Mooney
(74) *Attorney, Agent, or Firm* — Janet Kling

(57) ABSTRACT

An optical fiber connector includes a housing configured to mate with a receptacle, a collar body that includes a fiber stub and a mechanical splice device, a backbone to retain the collar body within the housing, and a boot. The backbone includes at least one guide channel to facilitate wrapping strength members of an optical fiber cable around the backbone and a cable jacket clamping portion to clamp the cable jacket of the cable. The boot actuates the cable jacket clamping portion of the backbone upon attachment to the backbone.

19 Claims, 18 Drawing Sheets

(52) U.S. Cl.
CPC ......... *G02B 6/3846* (2013.01); *G02B 6/3861* (2013.01); *G02B 6/3869* (2013.01)

(58) Field of Classification Search
USPC .............................................. 385/76–87, 95
See application file for complete search history.

(56) References Cited

U.S. PATENT DOCUMENTS

| | | |
|---|---|---|
| 5,159,653 A | 10/1992 | Carpenter et al. |
| 5,170,787 A | 12/1992 | Lindegren |
| 7,113,679 B2 | 9/2006 | Melton et al. |
| 7,135,787 B2 | 11/2006 | Alexandropoulos |
| 7,369,738 B2 | 5/2008 | Larson et al. |
| 2011/0116745 A1 | 5/2011 | Nishioka et al. |
| 2012/0308183 A1 | 12/2012 | Irwin et al. |
| 2012/0328248 A1 | 12/2012 | Larson et al. |
| 2013/0058612 A1 | 3/2013 | Arao et al. |
| 2014/0105552 A1 | 4/2014 | Sun |
| 2016/0018605 A1* | 1/2016 | Ott ........................ G02B 6/3887 385/78 |

FOREIGN PATENT DOCUMENTS

| | | |
|---|---|---|
| JP | 2004-210357 | 7/2004 |
| WO | WO 2006-019515 | 2/2006 |
| WO | WO 2006-019516 | 2/2006 |
| WO | WO 2009-131993 | 10/2009 |
| WO | WO 2009-148797 | 12/2009 |
| WO | WO 2014-164880 | 10/2014 |
| WO | WO 2015-050605 | 4/2015 |

\* cited by examiner

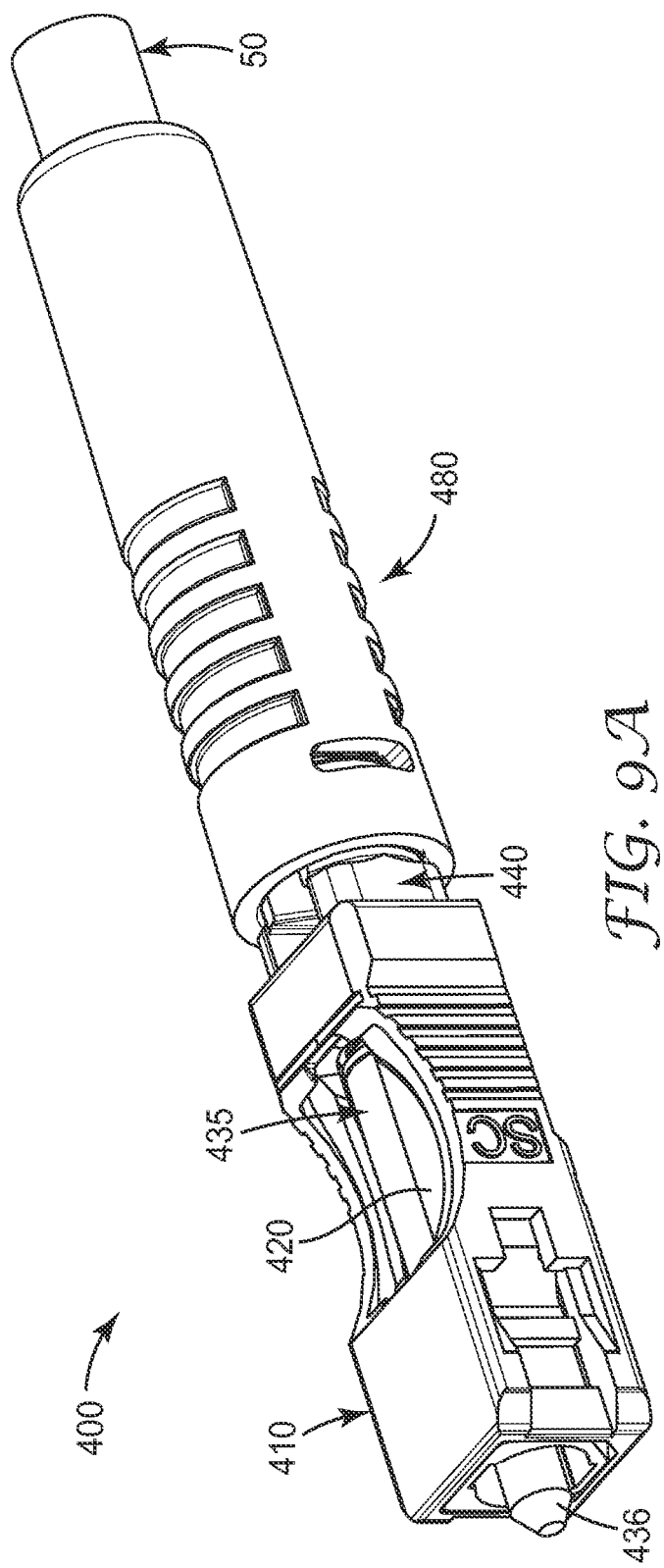

FIELD INSTALLED OPTICAL FIBER CONNECTOR FOR JACKETED FIBER CABLE AND TERMINATION METHOD

BACKGROUND

Field of the Invention

The present invention is directed to an optical fiber connector and method for terminating a jacketed optical fiber cable in the field. In particular, the exemplary connector includes a backbone that retains a collar body within an outer housing, wherein the backbone includes at least one guide channel to facilitate wrapping strength members of an optical fiber cable around a rear portion of the backbone and a cable jacket clamping portion to clamp a cable jacket that surrounds a portion of the optical fiber.

Related Art

Mechanical optical fiber connectors for the telecommunications industry are known. For example, LC, ST, FC, and SC optical connectors are widely used. However, commercially available optical fiber connectors are not well suited for field installations. Typically, an adhesive is required to mount these types of connectors on to an optical fiber. This process can be awkward and time consuming to perform in the field. Also post-assembly polishing requires that the craftsman have a higher degree skill.

Also known are hybrid optical fiber splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

More recently, U.S. Pat. No. 7,369,738 describes an optical fiber connector that includes a pre-polished fiber stub disposed in ferrule that is spliced to a field fiber with a mechanical splice. Such a connector, called a 3M™ No Polish Connector (also referred to as an NPC, is now commercially available through 3M Company (St. Paul, Minn.).

SUMMARY

According to a first embodiment of the present invention, an optical fiber connector for terminating a jacketed optical fiber cable is provided. The optical fiber connector includes a housing configured to mate with a receptacle, a collar body disposed in the housing, a backbone to retain the collar body within the housing, and a boot attachable to a portion of the backbone. The collar body includes a fiber stub mounted in a ferrule at a first end portion of the collar body and a mechanical splice device disposed within the collar body. The fiber stub has a first end proximate to an end face of the ferrule and a second end, such that the mechanical splice device is configured to splice the second end of the fiber stub to an optical fiber from the jacketed optical fiber cable. The backbone includes at least one guide channel to facilitate wrapping strength members of an optical fiber cable around a rear portion of the backbone and a cable jacket clamping portion to clamp a cable jacket that surrounds a portion of the optical fiber. The boot actuates the cable jacket clamping portion of the backbone upon attachment to the backbone.

According to a second embodiment of the present invention, a method for terminating a jacketed optical fiber cable with an optical connector is described. The optical fiber connector includes a fiber stub, and a backbone having at least one guide channel and a cable jacket clamp, wherein the jacketed optical fiber cable includes an optical fiber, a buffer layer surrounding the coated optical fiber, a cable jacket surrounding the buffer layer, and strength members axially disposed between the cable jacket and buffer layer. The method comprises the steps of removing a portion of the cable jacket at the terminal end of the jacketed optical fiber cable; removing a portion of the buffer layer to expose the coated optical fiber and preparing the terminal end of the coated optical fiber. The terminal end of the optical fiber is inserted into the connector until the terminal end of the optical fiber causing the optical fiber to form a bow within the connector which couples the prepared terminal end of the fiber to the stub fiber within the connector and forming a splice between the terminal end of the fiber and the stub fiber. The strength members are guided through the at least one guide channel and wrapped around the backbone. The boot is secured over the cable jacket clamping portion to engage with the cable jacket of the optical fiber cable and to secure strength members between the backbone and the boot within the optical fiber connector.

According to a third embodiment of the present invention, an optical fiber connector for terminating a jacketed optical fiber cable is provided. The optical fiber connector includes a housing configured to mate with a receptacle, a collar body disposed in the housing, a backbone to retain the collar body within the housing, and a press-on boot attachable to a portion of the backbone. The collar body includes a fiber stub mounted in a ferrule at a first end portion of the collar body and a mechanical splice device disposed within the collar body. The fiber stub has a first end proximate to an end face of the ferrule and a second end, such that the mechanical splice device is configured to splice the second end of the fiber stub to an optical fiber from the jacketed optical fiber cable. The backbone includes at least one guide channel to secure strength members of an optical fiber cable and a pair of cantilevered latches that engage with slots formed in the press-on boot to secure the press-on boot to the backbone. The press-on boot actuates the cable jacket clamping portion of the backbone upon attachment to the backbone.

According to a fourth embodiment of the present invention, an optical fiber connector for terminating a jacketed optical fiber cable is provided. The optical fiber connector includes a housing configured to mate with a receptacle, a ferruled collar assembly disposed in the housing to secure a bare glass portion of the optical fiber within the optical fiber connector, a backbone to retain the ferruled collar within the housing, and a press-on boot attachable to a portion of the backbone. The backbone includes at least one guide channel to secure strength members of an optical fiber cable and a pair of cantilevered latches that engage with slots formed in the press-on boot to secure the press-on boot to the backbone. The press-on boot actuates the cable jacket clamping portion of the backbone upon attachment to the backbone. The ferruled collar assembly includes a collar body and a ferrule disposed in a first end portion of the collar body.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 9A and 9B are two views of an optical fiber connector according to an embodiment of the present invention.

Figure 1A:
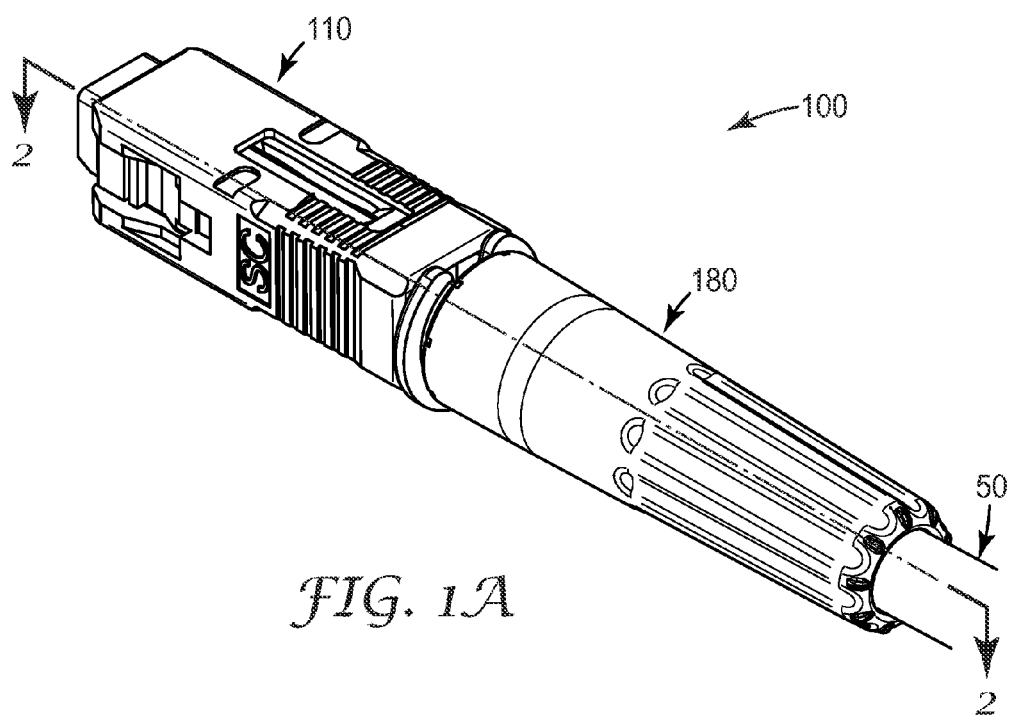
FIGS. 1A and 1B are two views of an optical fiber connector according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical fiber connector and method of field termination of a jacketed optical fiber cable. In particular, the optical fiber connector of the exemplary embodiments is of compact length and is capable of straightforward field termination. The exemplary connector(s) described herein can be readily installed and utilized for Fiber To The Home (FTTH) and/or Fiber To The X (FTTX) network installations. The exemplary connector(s) can be utilized in installation environments that require ease of use when handling multiple connections, especially where labor costs are more expensive. In addition, the exemplary connectors, described herein, provide higher pull out forces than other conventional field mount connectors, especially for outdoor jacketed cables.

Figure 1B:
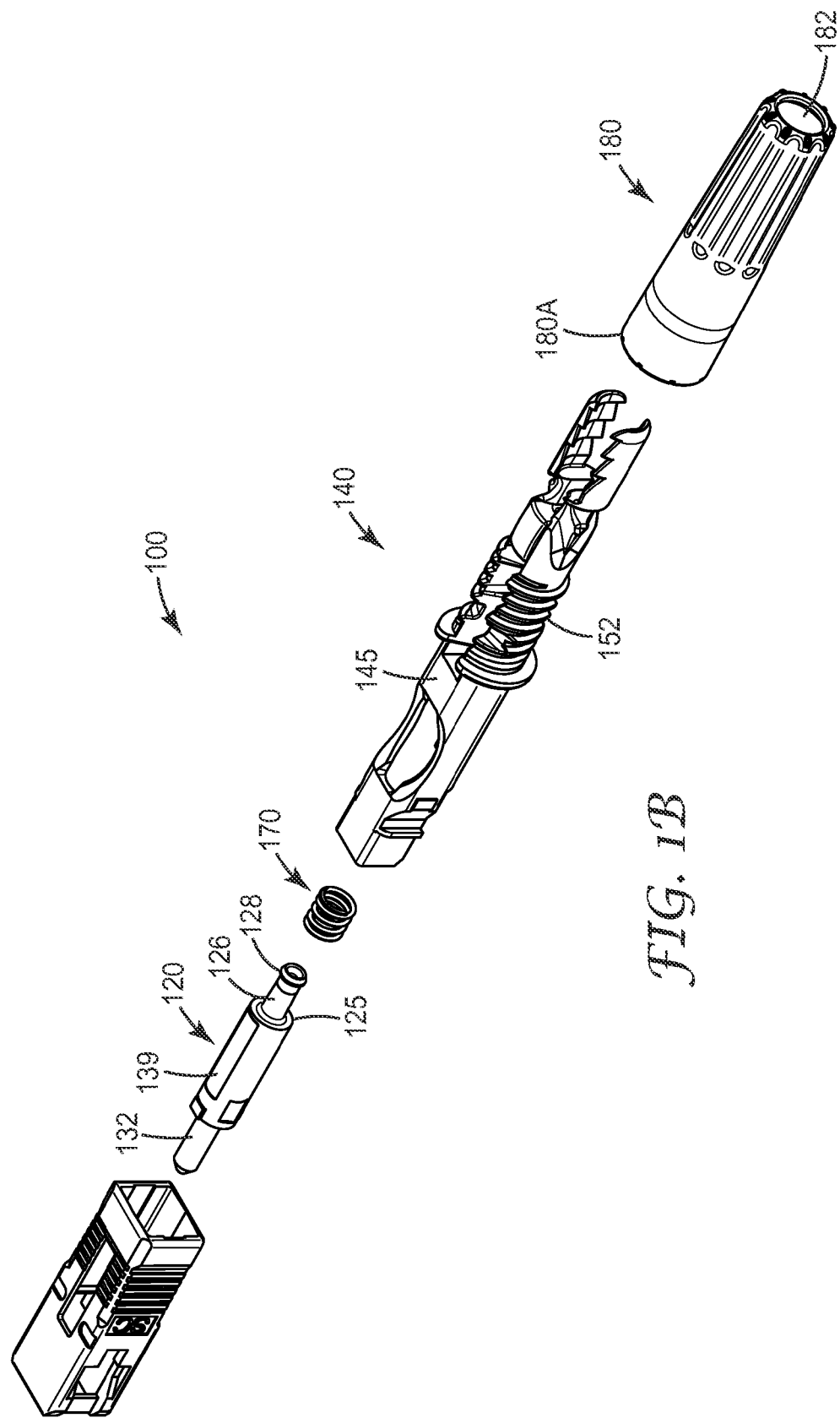

According to an exemplary embodiment of the present invention, an optical fiber connector 100 is shown in isometric assembled view in FIG. 1A and an isometric exploded view in FIG. 1B. Optical connector 100 is configured to mate with a receptacle of a corresponding format. For example, as shown in FIG. 1, exemplary optical connector 100 is configured as having an SC format. However, as would be apparent to one of ordinary skill in the art given the present description, optical connectors having other standard formats, such as ST, FC, and LC connector formats, can also be provided.

As shown in FIG. 1, SC-type optical fiber connector 100 can include a connector body having a housing 110 and a fiber boot 180. A dust cap (not shown) can be placed at the front end of the connector to protect the stub fiber end when not in use.

Connector 100 includes a housing 110 having an outer shell configured to be received in an SC receptacle (e.g., an SC coupling, an SC adapter, or an SC socket). As shown in FIG. 1B, connector 100 also includes a collar body 120 (which can also be referred to as a barrel) to house a ferrule and a splice device, a multi-purpose backbone 140 that retains the collar body 120 within the connector, and a boot 180.

In this exemplary embodiment, connector 100 can be utilized to terminate a field optical fiber cable 50 (see e.g., FIGS. 1A, 2, 5A and 5B). Optical fiber cable 50 is a jacketed optical fiber cable that includes a fiber portion (e.g., the bare clad/core, not shown in the figures), a coated portion 56 disposed on the fiber portion, a buffer layer 54 disposed over the coated portion, a plurality of strength members 58, and a cable jacket 52 disposed around and protecting all of the internal layers of the optical fiber cable. In a preferred aspect, the strength members 58 comprise aramid, Kevlar, or polyester yarn or strands disposed between an inner surface of the cable jacket 52 and an outer surface of the buffer layer. Optical fiber cable 50 can be a standard cylindrically shaped cable structure or it can be an alternatively shaped structure, such as a rectangular-shaped cable, oval or elliptical shaped cable. In an exemplary aspect, the optical fiber cable 50 is a standard optical fiber cable having a 250 µm coated portion, a 900 µm buffer layer and a cable jacket 52 having an outer diameter of from about 1.6 mm to about 5 mm. Of course, in alternative aspects, the connector can be adapted to accommodate fiber cables of different dimensions, as would be apparent to one of skill in the art given the present description. One advantage of the exemplary connector is that it can accommodate larger drop cable diameters while maintaining the current standard SC connector format.

In one aspect, the backbone 140 (see e.g., FIGS. 2, 3A-3C, and 5A-5B) provides structural support for the connector 100. The backbone 140 is an elongated hollow structure extending from a front end 140a to a back end 140b having a length of from about 50 mm to about 60 mm that clamps onto the jacket of the optical fiber cable being terminated. FIG. 3A is an isometric view of the exemplary backbone while FIG. 3B is a side view of the exemplary backbone and FIG. 3C is top view of the exemplary backbone. Moreover, the backbone 140 can provide further axial strain relief by securing the strength members of the optical fiber being terminated.

Backbone 140 includes a hollow front portion 141 configured to receive the connector collar body and a rear portion 151 separated from the front portion by an abutment 149. The backbone includes an opening (not shown) at a front end 140a to allow for insertion of the collar body 120 into the hollow front portion of the backbone. Backbone 140 further includes an access opening 147 through a side wall of the front portion of the backbone, which provides access to actuate a mechanical splice device disposed within the connector collar body that is secured within the front portion of the backbone. In a preferred aspect, as is shown in FIGS. 3A and 3B, access opening 147 can have a cut-out or shallow depression formed on the sides to accommodate a user's thumb or finger during actuation of the splice device. The backbone 140 has an axial bore throughout to permit passage of the optical fiber being terminated.

The rear portion 151 of backbone 140 can have comprises a collet-type, split body shape having two collet legs at the second end of the backbone. The backbone 140 can further include a mounting structure 152 that provides for coupling to the fiber boot 180. In an exemplary aspect, the mounting structure comprises a threaded surface formed on an outer portion of backbone 140 that is configured to engage corresponding threaded grooves disposed inside of the first end 180a of the boot 180. In addition, the mounting structure 152 can provide a retention area for securing the strength members of the optical fiber cable being terminated.

Backbone 140 includes a fiber guide 153 formed in the interior of rear portion 151 therein to provide axial alignment support for the optical fiber cable being terminated. In an exemplary aspect, the fiber guide portion 153 can include a recess 153a configured to hold a buffer layer gripping device 158 that is disposed adjacent to a funnel-shaped channel or groove 153b that aligns a buffered portion of the optical fiber and guides the fiber toward the mechanical splice device 135 housed in the collar body 120.

The backbone 140 includes a collar body mount structure 145 configured to receive and secure the collar body 120 within the backbone. In a preferred aspect, collar body mount structure 145 comprises a rigid structure formed in an interior region of backbone 140 having an axial bore therethrough. The axial bore can be of appropriate size to receive and engage raised end structure 128 of collar body 120 (see FIG. 1B). In addition, collar body mount structure 145 also forms a shoulder within the backbone that can be used as a flange to provide resistance against spring 170 that is positioned over the second end portion 126 of the collar body 120. The spring 170 provides and maintains an adequate contact force when two connectors are joined together.

Backbone 140 can further include one or more stops 154 formed on an interior portion thereof to provide a boundary for the insertion of the cable jacket 52 of the optical fiber cable 50 being terminated (as explained in more detail below). In addition, backbone 140 includes a first clamping portion 158 formed in the rear portion of the backbone and a second clamping portion 156 formed at a back end 140b of the backbone.

The first clamping portion is configured to clamp onto the buffer layer 54 of the optical fiber cable 50 using a buffer gripping device 158 which fits into recess 153a being terminated in connector 100. The first clamping portion or buffer clamp grips the buffer layer to control the pistoning of the optical fiber out of the optical fiber cable as a result of environmental changes (e.g. temperature, humidity, etc.) which otherwise may increase loss or in the worst case break the optical fiber. In an exemplary aspect, the buffer gripping device can include a plug body 158a having an aperture 158b extending longitudinally therethrough. In an exemplary aspect, aperture 158b can have a generally catenoid profile as it extends through the plug body. In another aspect, the plug body can have a slit 158c that extends from the surface 158d of the plug body through a side wall 158e of the plug body into the aperture to allow easy insertion of a buffer coated portion of the optical fiber cable into the aperture within the plug body. After insertion of the buffer coated portion of the fiber the exemplary buffer gripping device can be inserted into recess 153a in the back bone of exemplary optical fiber connector 100.

In one exemplary aspect, buffer gripping device 158 can be formed of a deformable plastic or elastomer so that when the boot is tightened onto the back ends of the backbone squeezing the collet style legs together, pressure from the collet legs will squeeze the buffer gripping device to tightly hold the buffer layer of the optical fiber cable. In an exemplary aspect, the deformable plastic or elastomer can be selected from a low density polyethylene, a vulcanized rubber material, a silicone rubber material and a ethylene propylene diene monomer rubber material.

The second clamping portion 156 is configured to clamp onto the cable jacket 52 of the optical fiber cable 50 being terminated in connector 100. In a preferred aspect, second clamping portion 156 comprises a collet-type, split body shape that is actuated when the boot 180 is secured to mounting structure 152. The second clamping portion can include raised inner surfaces (i.e. ridges, barbs, or teeth) to permit ready clamping of the cable jacket 52. In an exemplary aspect, the raised inner surfaces of the second clamping portion can be angled so that they will bite in harder to a cable being pulled out of the exemplary connector. In addition, the second clamping portion 156 also can provide a guide structure when inserting fiber cable 50 during the termination process. Thus, boot can be utilized to clamp the fiber strength members 58 and the cable jacket 52. The interaction of the boot 180 and the backbone 140 will be described in greater detail below.

In an exemplary aspect, the one or more stops 154 are disposed between the first clamping portion and the second clamping portion and serve as the boundary for the insertion of the cable jacket 52. In other words, the jacketed portion of the optical fiber cable can be inserted into the back end of the backbone through the second clamping portion until the leading edge of the cable jacket abuts against the one or more stops, thus preventing the jacketed portion of the optical fiber cable from moving any further forward within the exemplary connector.

In an exemplary aspect, backbone 140 further includes enhanced means for securing the strength members 58 of an optical fiber cable 50 within connector 100 improving the strain relief and pull resistance of the connector. Specifically, the backbone includes first guide channels 155a formed in the rear portion 151 of the backbone between the mounting structure 152 and the second clamping portion 156 and a second guide channel 155b disposed within mounting structure 152 transverse to the longitudinal axis of the backbone to facilitate wrapping at least a portion of the strength members around the rear portion of the backbone. Optionally, the backbone can have a hook disposed on the backbone on a side opposite the second guide channel to further aid in placement of the strength members as they are wrapped around the backbone. The wrapped strength members are secured to the backbone by when the boot is attached to the mounting structure. The strength members are trapped between the external threads of the mounting structure and the internal threads of the boot. The wrapping of the strength members prevents the slippage of the optical fiber within the connector due to an external pulling force on the cable.

According to an exemplary embodiment of the present invention, housing 110, collar body 120, backbone 140 and boot 180 are formed or molded from a polymer material, although metal and other suitably rigid materials can also be utilized. For example, one exemplary material can comprise a fiberglass reinforced polyphenylene sulfide resin. Housing 110 is preferably secured to an outer surface of backbone 140 via snap fit.

Figure 2:
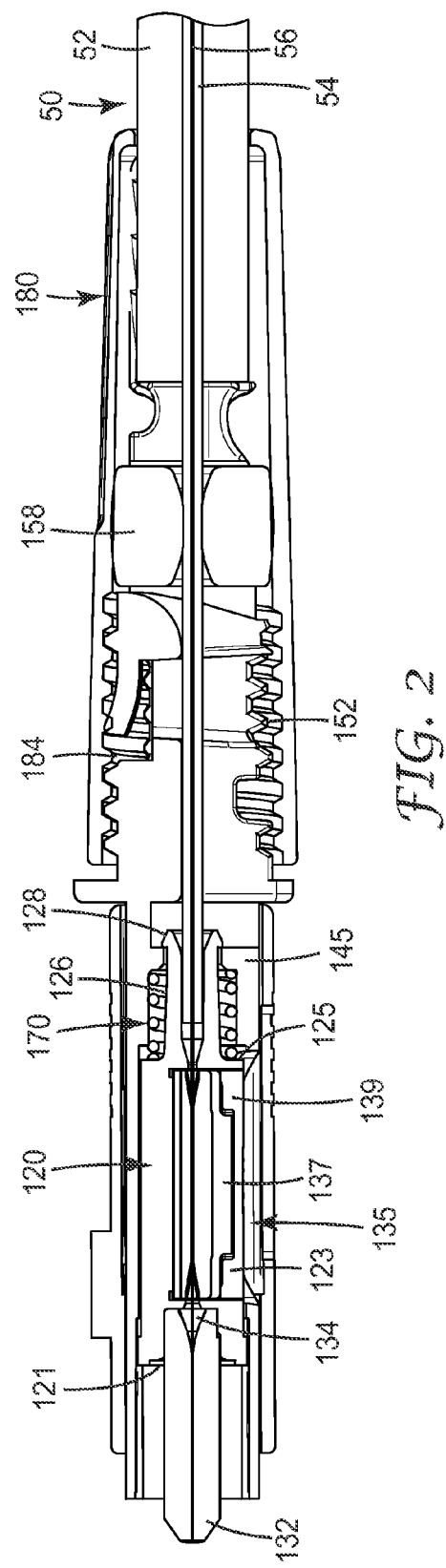
FIG. 2 is a schematic cross-sectional view of the optical fiber connector of FIG. 1A.
Figure 3A:
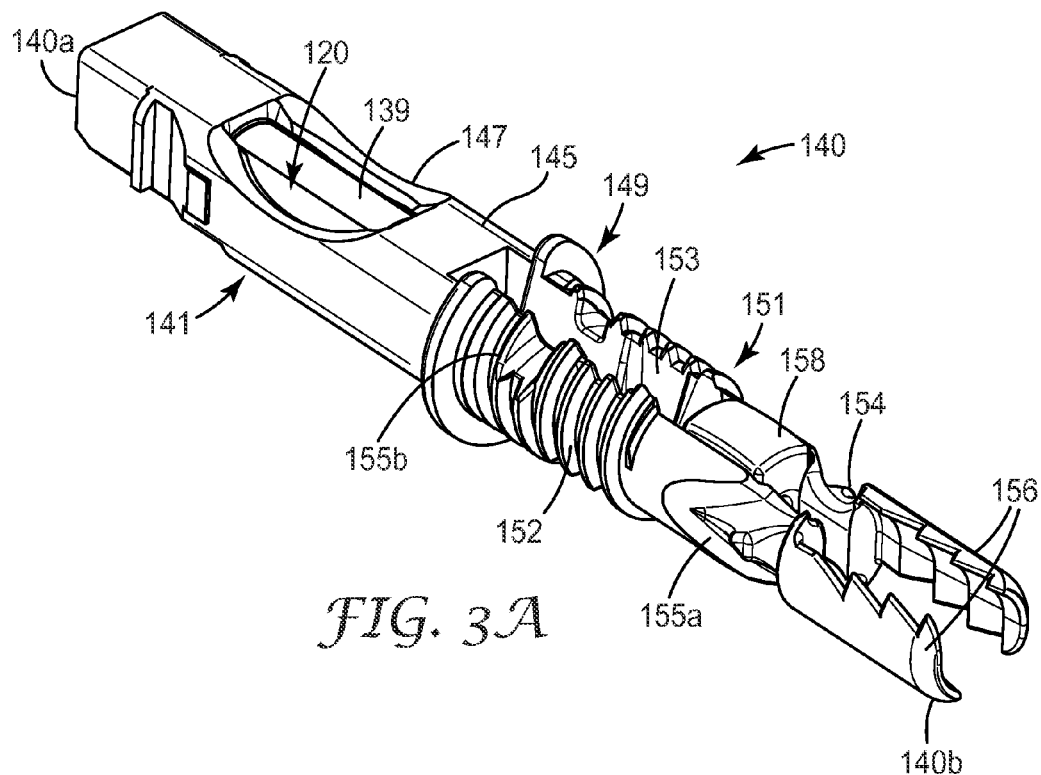
FIGS. 3A-3C are three views of an exemplary backbone of the optical fiber connector of FIGS. 1A-1B.
Figure 3B:
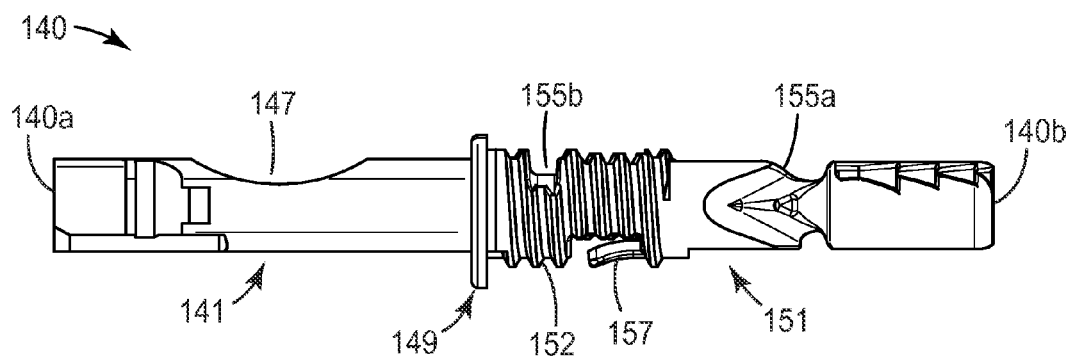
Figure 3C:
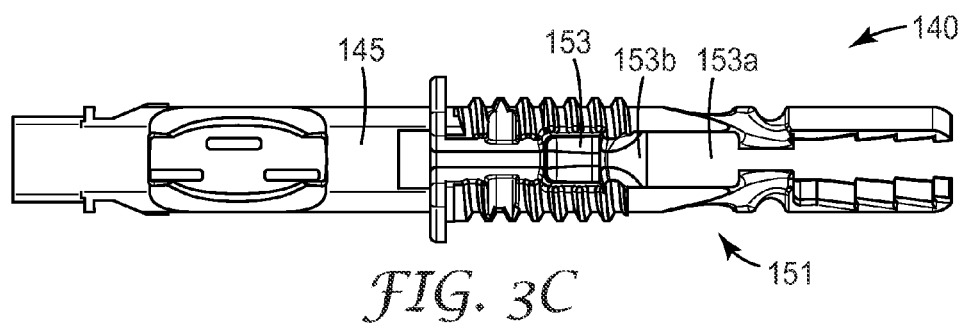
Figure 4A:
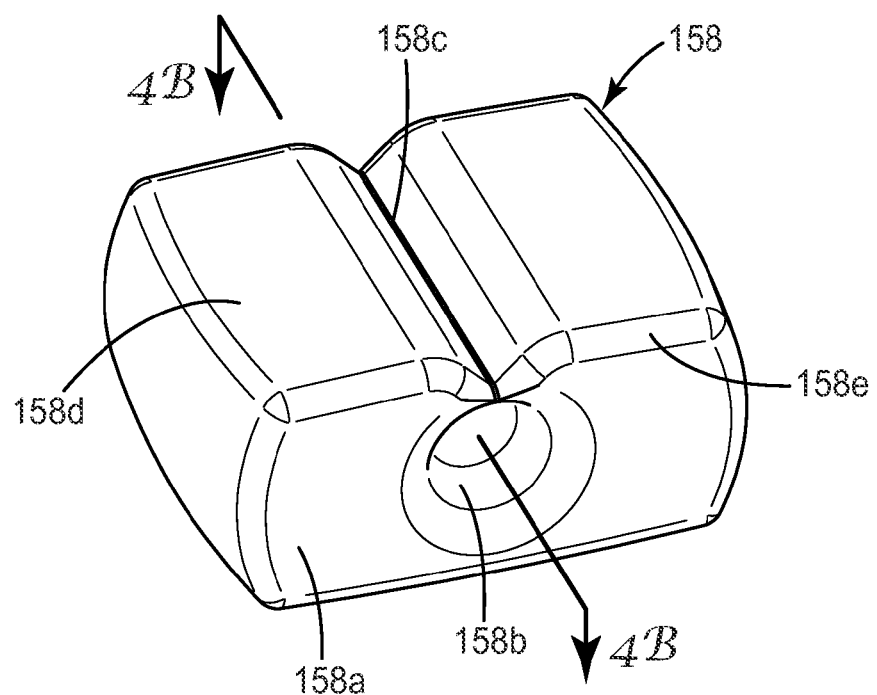
FIG. 4A-4B are two views of an exemplary buffer gripping device of an optical fiber connector according to an embodiment of the present invention.
Figure 4B:
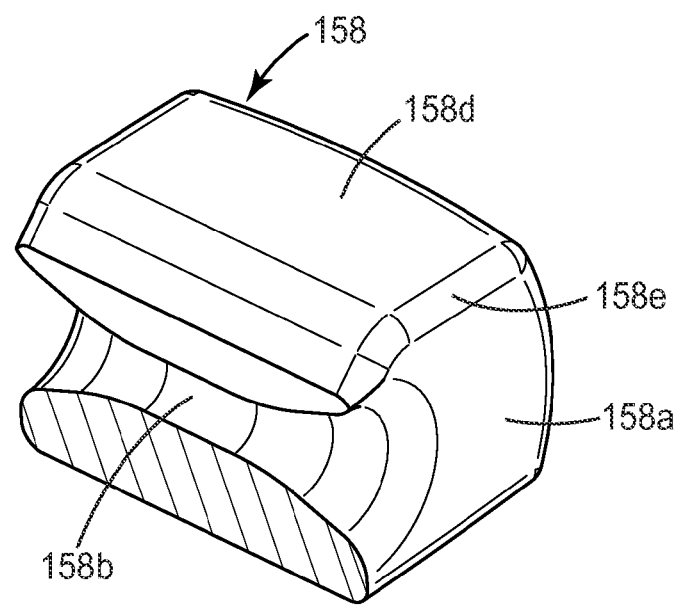
Figure 5A:
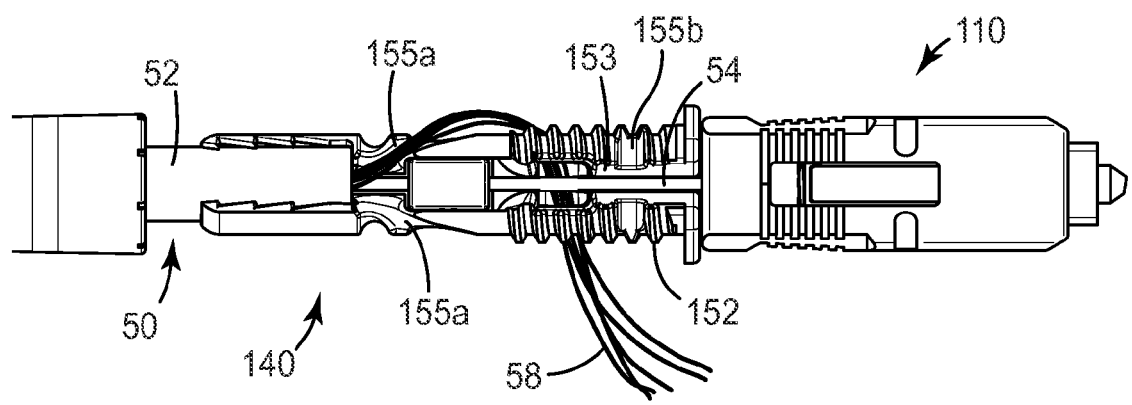
FIGS. 5A and 5B illustrate how strength members of a jacketed optical fiber cable can be wrapped around the exemplary backbone of FIGS. 3A-3C during the optical fiber cable termination process.
Figure 5B:
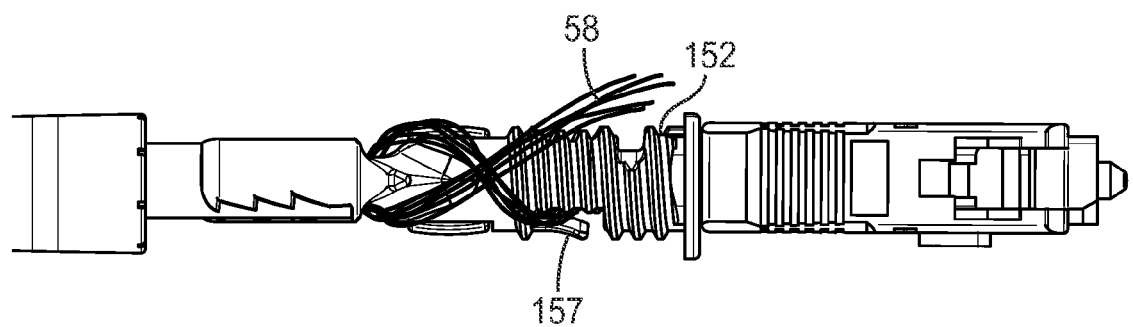

Referring to FIGS. 1B and 2, connector 100 further includes a collar body 120 that is disposed within the connector housing and retained by the backbone. According to exemplary embodiments, the collar body 120 is a multi-purpose element that can house a ferrule 132 and optical fiber stub 134 and a mechanical splice device 135. The collar body is configured to have some limited axial movement within backbone 140. For example, the collar body 120 can include a collar or shoulder 125 that can be used as a flange to provide resistance against spring 170 (see FIG. 1B), interposed between the collar body and the collar body mount structure 145. According to an exemplary embodiment of the present invention, collar body 120 can be formed or molded from a polymer material, although metal and other suitable materials can also be utilized. For example, collar body 120 can be formed with an injection-molded, polymer material.

In particular, collar body 120 includes a first end portion 121 having an opening to receive and house a ferrule 132 having an optical fiber stub 134 secured therein. The collar body also includes a second end portion 126 configured to engage with the collar body mount structure 145 of backbone 140. In a preferred aspect, second end portion 126 has a raised end structure 128 that has a sloping shape that is insertable through the bore of the collar body mount structure 145, as is shown in FIG. 1B. Raised end structure 128 of the second end portion can be inserted into the bore and engage against collar body mount structure 145 due to the bias of the spring 170 as shown in FIG. 2.

The collar body 120 also secures the fiber stub and ferrule in place in the connector 100. Ferrule 132 can be formed from a ceramic, glass, plastic, or metal material to support the optical fiber stub 134 inserted and secured therein. In a preferred aspect, ferrule 132 is a ceramic ferrule.

An optical fiber stub 134 is inserted through the ferrule 132, such that a first fiber stub end slightly protrudes from or is coincident or coplanar with the end face of ferrule 132. Preferably, this first fiber stub end is factory polished (e.g., a flat or angle-polish, with or without bevels). A second end of the fiber stub 134 extends part-way into the interior of the connector 100 and is spliced to the fiber portion of an optical fiber cable (such as optical fiber cable 50). Preferably, the second end of fiber stub 134 can be cleaved (flat or angled, with or without bevels).

In one aspect, the second end of fiber stub 134 can be polished in the factory to reduce the sharpness of the edge of the fiber, which can create scrapings (debris) as it is installed in the splice element. For example, an electrical arc, such as one provided by a conventional fusion splicer machine, can be utilized to melt the tip of the fiber and form a rounded end, thereby removing the sharp edges. This electrical arc technique can be used in conjunction with polishing by an abrasive material to better control end face shape while reducing possible distortion of the core. An alternative non-contact method utilizes laser energy to ablate/melt the tip of the fiber.

Fiber stub 134 and fiber portion 56 can comprise standard single mode or multimode optical fiber, such as SMF 28 (available from Corning Inc.). In an alternative embodiment, fiber stub 134 additionally includes a carbon coating disposed on the outer clad of the fiber to further protect the glass-based fiber. In an exemplary aspect, fiber stub 134 is pre-installed and secured (e.g., by epoxy or other adhesive) in ferrule 132, which is disposed in the first end portion 121 of collar body 120. Ferrule 132 is preferably secured within collar body first end portion 121 via an epoxy or other suitable adhesive. Preferably, pre-installation of the fiber stub can be performed in the factory.

Referring back to FIG. 2, collar body 120 further includes a splice element housing portion 123. In an exemplary aspect, splice element housing portion 123 provides an opening in which a mechanical splice element 137 can be inserted and secured in the central cavity of collar body 120. In an exemplary embodiment, mechanical splice element 127 is part of a mechanical splice device 135 (also referred to herein as a splice device or splice), such as a 3M™ FIBRLOK™ mechanical fiber optic splice device, available from 3M Company, of Saint Paul, Minn.

For example, commonly owned U.S. Pat. No. 5,159,653, incorporated herein by reference in its entirety, describes an optical fiber splice device (similar to a 3M™ FIBRLOK™ II mechanical fiber optic splice device) that includes a splice element that comprises a sheet of ductile material having a focus hinge that couples two legs, where each of the legs includes a fiber gripping channel (e.g., a V-type (or similar) groove) to optimize clamping forces for conventional glass optical fibers received therein. The ductile material, for example, can be aluminum or anodized aluminum. In addition, a conventional index matching fluid can be preloaded into the V-groove region of the splice element for improved optical connectivity within the splice element. In another aspect, no index matching fluid is utilized.

In this exemplary aspect, the splice element of the splice device 135 can be configured similar to the splice element from a 3M™ FIBRLOK™ II mechanical fiber optic splice device or a 3M™ FIBRLOK™ 4×4 mechanical fiber optic splice device. Other conventional mechanical splice devices can also be utilized in accordance with alternative aspects of the present invention and are described in U.S. Pat. Nos. 4,824,197; 5,102,212; 5,170,787; and 7,135,787, each of which is incorporated by reference herein, in their entirety.

Mechanical splice element of the splice device 135 allows a field technician to splice the second end of fiber stub 134 to a stripped fiber portion (e.g. the bare glass portion of an optical fiber cable 50 at a field installation location. In an exemplary embodiment, utilizing a 3M™ FIBRLOK™ II mechanical fiber optic splice device, splice device 135 can include splice element 137 and an actuating cap 139 (FIGS. 1B, 2 and 3A). The two fiber ends, (e.g., one end of fiber stub 134 and one end of fiber portion from optical fiber cable 50) are butted against each other and held in place in the splice element, such as in a V-groove channel, to provide sufficient optical connection. In operation, as the cap 139 is moved from an open position to a closed position, one or more cam bars located on an interior portion of the cap 139 can slide over the splice element legs, urging them toward one another to complete the splice.

Splice element of the exemplary splice device 135 is disposed in a mounting device or cradle that is located in splice element housing portion 123 of collar body 120. In an exemplary embodiment, the cradle is integrally formed in collar body 120, e.g., by molding. The cradle can secure (through e.g., snug or snap-fit) the axial and lateral position of the splice element 137. The mounting device can be configured to hold the splice element such that the splice device 135 cannot be rotated or easily moved forward or backward once installed.

The mechanical splice allows a field technician to splice the second end of fiber stub 134 to the fiber portion of an optical fiber cable 50 at a field installation location. The term "splice," as utilized herein, should not be construed in a limiting sense since splice device 135 can allow removal of a fiber. For example, the element can be "re-opened" after initial actuation, where the splice element housing portion can be configured to allow for the removal of the actuating cap if so desired by a screw driver or similar device. This configuration permits repositioning of the spliced fibers, followed by replacement of the cap to the closed position.

As mentioned above, fiber boot 180 can be utilized for several purposes with optical connector 100. As shown in FIGS. 1A, 1B and 2, boot 180 includes a tapered body having an axial bore 182 throughout. The boot 180 includes threaded grooves 184 (FIG. 2) formed on an inner surface of the body 182, where the grooves are configured to engage with the correspondingly threaded mounting structure 152 of the backbone 140. In addition, the axial length of boot 180 is configured such that a rear section of the boot, which has a smaller opening than at front opening, engages the jacket clamp portion 156 of the backbone. For example, as is explained in more detail below, as the boot 180 is secured onto the mounting structure 152 of the backbone, the axial movement of the boot relative to the backbone forces the legs of clamp portion 156 to move radially inwards so that the cable jacket 52 is tightly gripped in the second clamping portion 154 of the backbone and the buffer gripping device 158 is squeezed in the first clamping portion to tightly hold onto the buffer layer of optical fiber cable 50.

The strength members 58 of the optical fiber cable which are wrapped around the backbone of the connector can be disposed between the boot and the mounting structure 152 to secure the strength members as the boot is installed. This construction can also provide a connector termination capable of surviving rougher handling and greater pull forces than conventional field mount connectors.

In an exemplary aspect, boot 180 is formed from a rigid material. For example, one exemplary material can comprise a fiberglass reinforced polyphenylene sulfide resin or a polyether imide resin, such as an ULTEM material (available from SABIC). In another aspect, the materials used to form the boot 180 and the backbone 140 are the same.

An exemplary fiber cable utilized in this embodiment comprises a 3.0 mm jacketed communication cable, such as a patch cord or drop cable, commercially available from Samsung Cable, Thai-han Cable (Korea), ClearCurve® Compact Drop, Tight-Buffered Cable, 1 F, Single-mode (OS2, ClearCurve) commercially available from Corning Optical Communications (Hickory, N.C. USA) and FTTH Overhead indoor/outdoor drop cable commercially available from Draka (Netherlands). As would be understood by one of ordinary skill in the art given the present description, the optical connector of the exemplary embodiments can be configured to terminate the fibers of other types of jacketed cable, including 3.5 mm communication cable, 5 mm communication cables, and others.

As mentioned above, the optical fiber connector of the exemplary embodiments is of compact length and is capable of straightforward field termination. As discussed above, the optical fiber connector is partly assembled by inserting the collar body 120, with ferrule 132 secured therein, within backbone 140. As mentioned above, the raised end structure 128 of the collar body is inserted into the bore of collar body mount structure 145 as shown in FIG. 2. The spring 170 is placed over the second portion of the collar body prior to installation in the backbone and will provide some bias against axial movement after insertion.

For field termination, an optical fiber cable, such as cable 50, is prepared by stripping off a portion of the cable jacket 52 at the cable end, leaving the remaining buffer layer 54, coated portion 56, fiber portion, and strength members 58 intact. For the exemplary SC-type connector 100 shown in the figures, this portion of the cable jacket can be about 65 mm or so. Next, a portion of the buffer layer 54 is removed from the terminal end of the cable leaving between about 25 mm and about 40 mm of the buffer layer 54 extending from the edge of the cable jacket leaving the coated portion 56, and strength members 58 exposed near the terminal end of the optical fiber cable. The terminal end of the fiber is further prepared by stripping off a portion of the coated portion 56 near the terminating fiber end to reveal a bare fiber portion of the optical fiber cable. The exposed bare fiber portion can be cleaned to remove any remaining residue. The terminal end of the bare fiber portion can be cleaved (flat or angled) to match the orientation of the pre-installed fiber stub disposed within the exemplary connector. In an exemplary aspect, about 8 mm-15 mm of bare fiber portion remains. For example, a commercial fiber cleaver such as an Ilsintech MAX CI-01 or the Ilsintech MAX CI-08, available from Ilsintech, Korea (not shown) can be utilized to provide a flat or an angled cleave. No polishing of the fiber end is required, as a cleaved fiber can be optically coupled to the fiber stub 134 within the mechanical splice device disposed within the partially pre-assembled connector.

The terminal end of optical fiber cable 50 can be inserted in the rear end of the connector (i.e., through the second clamping portion 156 of the connector backbone). In this manner, the prepared fiber end can be spliced to the fiber stub with the mechanical splice device 135. The fiber cable 50 is continually inserted until the coated portion 54 of the fiber begins to bow (which occurs as the end of fiber portion 56 meets the fiber stub 134 with sufficient end loading force). In addition, the stops 154 formed on an interior portion of the backbone can provide a boundary to stop further insertion of the cable jacket 52 of the optical fiber cable 50.

The splice device can then be actuated while the fibers are subject to an appropriate end loading force. To actuate the splice device, a user presses downward (with a modest thumb or finger force) onto the cap 139 of the splicing device. Alternatively, connector 100 can be mounted in a termination platform or tool, such as the 8865 AT tool, commercially available from 3M Company. In this manner, a portion of the fiber cable can be clamped by the termination tool during the actuation process.

The buffer gripping device 158 can then be slipped over the buffer layer of the optical fiber, by inserting the optical fiber buffered portion though the slit in the side of the buffer gripping device. The buffer gripping device can be positioned so that there is a small bow in the optical fiber between the collar body and the buffer gripping device. The presence of the bow can improve the thermal compensating performance of the connector.

Referring now to FIGS. 3A-3C and 5A-5B, the strength members 58 are wrapped around the backbone 140 toward the front portion of the backbone (which is disposed inside of housing 110) by first laying the strength members in the first guide channel 155a and wrapping them around the backbone sliding them between hook 157 and the backbone. The strength members are now wrapped toward the back end 140b of the backbone through the hook and back through the first guide channel completing a figure-8 wrap.

The boot 180 (which is previously threaded onto fiber cable 50) is then pushed axially toward the backbone mounting structure 152 (see FIG. 2) and then screwed onto the backbone mounting structure 152 to secure the boot 180 in place. As mentioned above, the installation of the boot 180 onto the backbone 140 tightens the collet-style second clamping portion 156 onto the cable jacket. During this installation, the user can hold the strength members 58 in place over the mounting structure 152 by application of a modest force (e.g., by thumb pressure). As the boot 180 is mounted onto the backbone mounting structure 152, the strength members are secured in place between the boot 180 and the backbone mounting structure 152. After completion of the boot installation, the excess strength members can be removed (e.g., cut away).

Figure 6:
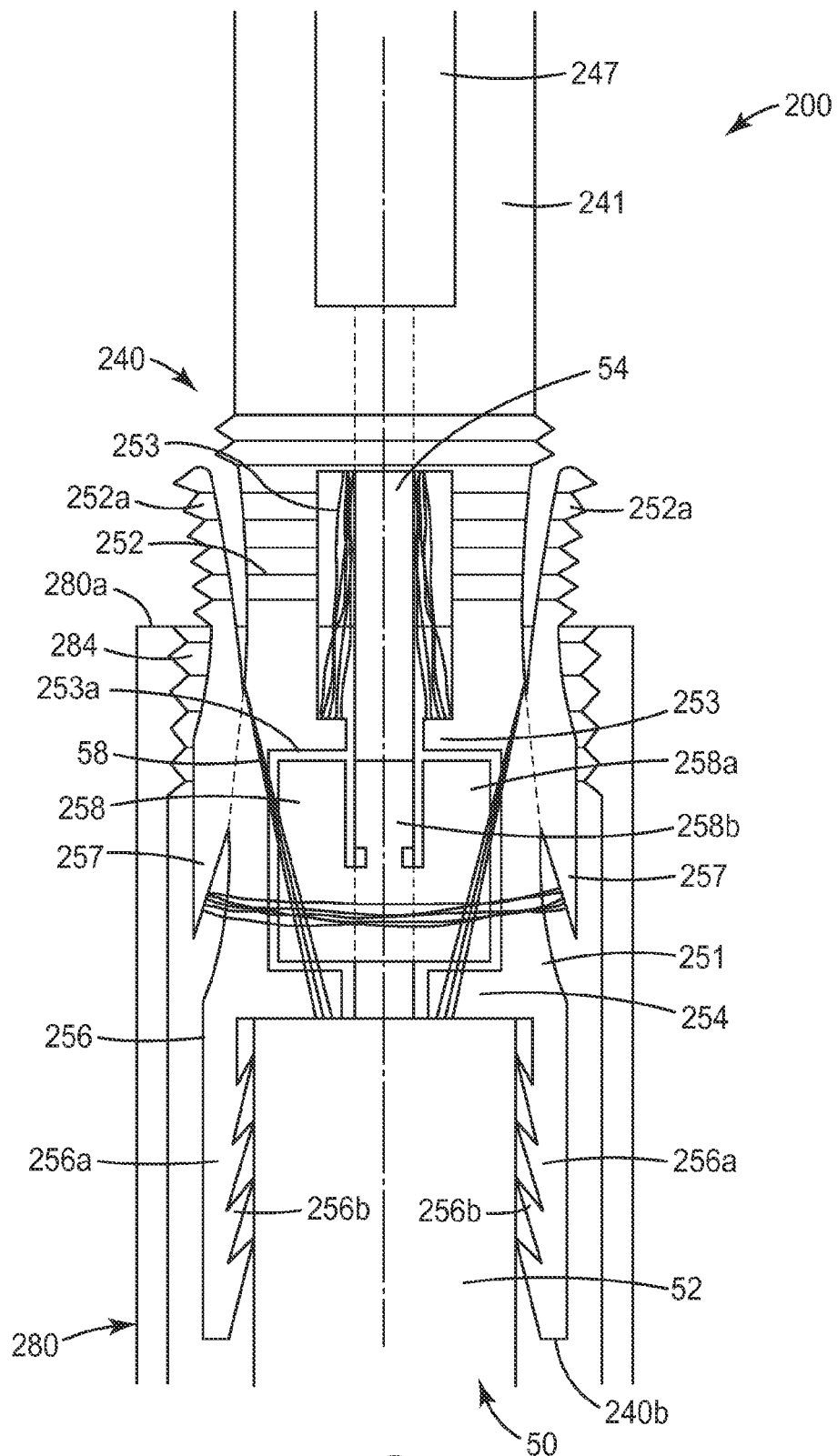
FIG. 6 shows a schematic detail view of a portion of an alternative exemplary backbone of the optical fiber connector according to the current invention.

FIG. 6 shows a detailed view of an alternative backbone structure configured to facilitate wrapping of the strength members of an optical fiber cable around the backbone to provide added strain relief for the fiber cable. In Particular, FIG. 6 is a schematic cross section of exemplary backbone 240 and boot 280. Other key portions of the connector such as the housing, housing and mechanical splice devices are substantially the same as those described previously and so will not be described in detail hereafter.

As before, the backbone 240 provides structural support for the exemplary optical fiber connector. Backbone 240 includes a hollow front portion 241 configured to receive the connector collar body and a rear portion 251. The backbone includes an opening (not shown) at a front end to allow for insertion of the collar body (not shown) into the hollow front portion of the backbone. Backbone 240 further includes an access opening 247 through a side wall of the front portion of the backbone, which provides access to actuate a mechanical splice device disposed within the connector collar body that is secured within the front portion of the backbone. In a preferred aspect, access opening 247 can have a cut-out or shallow depression formed on the sides to accommodate a user's thumb or finger during actuation of the splice device. The backbone 240 has an axial bore throughout to permit passage of the optical fiber being terminated.

The rear portion 251 of backbone 240 can have comprises a collet-type, split body shape having two collet legs 256a at the second end 240b of the backbone that make up the jacket clamping portion 256 of the connector. The backbone 240 can further include a mounting structure 252 that provides for coupling to the fiber boot 280. In an exemplary aspect, the mounting structure comprises a threaded surface formed on an outer portion of backbone 240 that is configured to engage corresponding threaded grooves 284 disposed inside of the first end 280a of the boot 280. In addition, the mounting structure 252 can provide a retention area for securing the strength members of the optical fiber cable being terminated in the form of cantilevered extensions 252a on opposing sides of the backbone which can be pressed in to capture the strength members 58 of optical fiber cable between the body of the backbone and the cantilevered extensions when the boot is secured over the rear portion of the backbone. In an exemplary aspect, the backbone can further include a pair of rearward facing hooks 257 which can be paired with the cantilevered extensions to secure the strength members wrapped around the backbone.

For example, strength member 58 from the optical fiber cable can be divided into two bundles and routed up and over the cantilevered extensions as shown in FIG. 6. They can then be routed down toward the second end of backbone 240 so that they are captured behind rearward facing hooks 257. After wrapping over the front of the backbone, the strength members can again be captured under rearward facing hooks 257 and routed to the backside of the backbone where they can be gathered and held by the installer's thumb while the boot is attached to the rear portion of the backbone of the exemplary connector.

Backbone 240 includes a fiber guide 253 formed in the interior of rear portion 251 therein to provide axial alignment support for the optical fiber cable being terminated. In an exemplary aspect, the fiber guide portion 253 can include a recess 253a configured to hold a buffer layer gripping device 258 that aligns a buffered portion 52 of the optical fiber and guides the fiber toward the mechanical splice device housed in the collar body. Buffer layer gripping device can be fabricated from a rigid plastic material similar to the material used to fabricate the backbone of the exemplary connector.

Backbone 240 can further include one or more stops 254 formed on an interior portion thereof to provide a boundary for the insertion of the cable jacket 52 of the optical fiber cable 50 being terminated (as explained in more detail below). In addition, backbone 240 includes a first clamping portion 258 formed in the rear portion of the backbone and a second clamping portion 256 formed at a back end 240b of the backbone.

The first clamping portion is configured to clamp onto the buffer layer 54 of the optical fiber cable 50 using a buffer gripping device 258 which fits into recess 253a being terminated in connector 200. The first clamping portion or buffer gripping device exerts a holding pressure on the buffer layer to control the pistoning of the optical fiber out of the optical fiber cable as a result of environmental changes (e.g. temperature, humidity, etc.) which otherwise may increase loss or damage the optical fiber. In an exemplary aspect, the buffer gripping device can include a plug body 258a having an aperture (not shown) extending longitudinally therethrough and a pressure foot 258b that can be actuated when the boot is fully attached to the backbone of the connector. After insertion of the buffer coated portion of the fiber through the buffer gripping device, the exemplary buffer gripping device can be inserted into recess 253a in the back bone of exemplary optical fiber connector. In one exemplary aspect, buffer gripping device 258 can be formed of a deformable plastic or elastomer so that when the boot is tightened onto the back ends of the backbone, the buffer gripping device tightly holds the buffer layer of the optical fiber cable.

The second clamping portion 256 is configured to clamp onto the cable jacket 52 of the optical fiber cable 50 being terminated in connector 200. In a preferred aspect, second clamping portion 256 comprises a collet-type, split body shape that is actuated when the boot 280 is secured to mounting structure 252. The second clamping portion can include raised inner surfaces (i.e. ridges, barbs, or teeth

256b) to permit ready clamping of the cable jacket 52. In an exemplary aspect, the raised inner surfaces of the second clamping portion can be angled so that they will bite in harder to a cable being pulled out of the exemplary connector. In addition, the second clamping portion 256 also can provide a guide structure when inserting fiber cable 50 during the termination process. Thus, boot can be utilized to clamp the fiber strength members 58 and the cable jacket 52.

Backbone 240 can further include one or more stops 254 disposed between the first clamping portion and the second clamping portion and serve as the boundary for the insertion of the cable jacket 52. In other words, the jacketed portion of the optical fiber cable can be inserted into the back end of the backbone through the second clamping portion until the leading edge of the cable jacket abuts against the one or more stops, thus preventing the jacketed portion of the optical fiber cable from moving any further forward within the exemplary connector.

Figure 7:
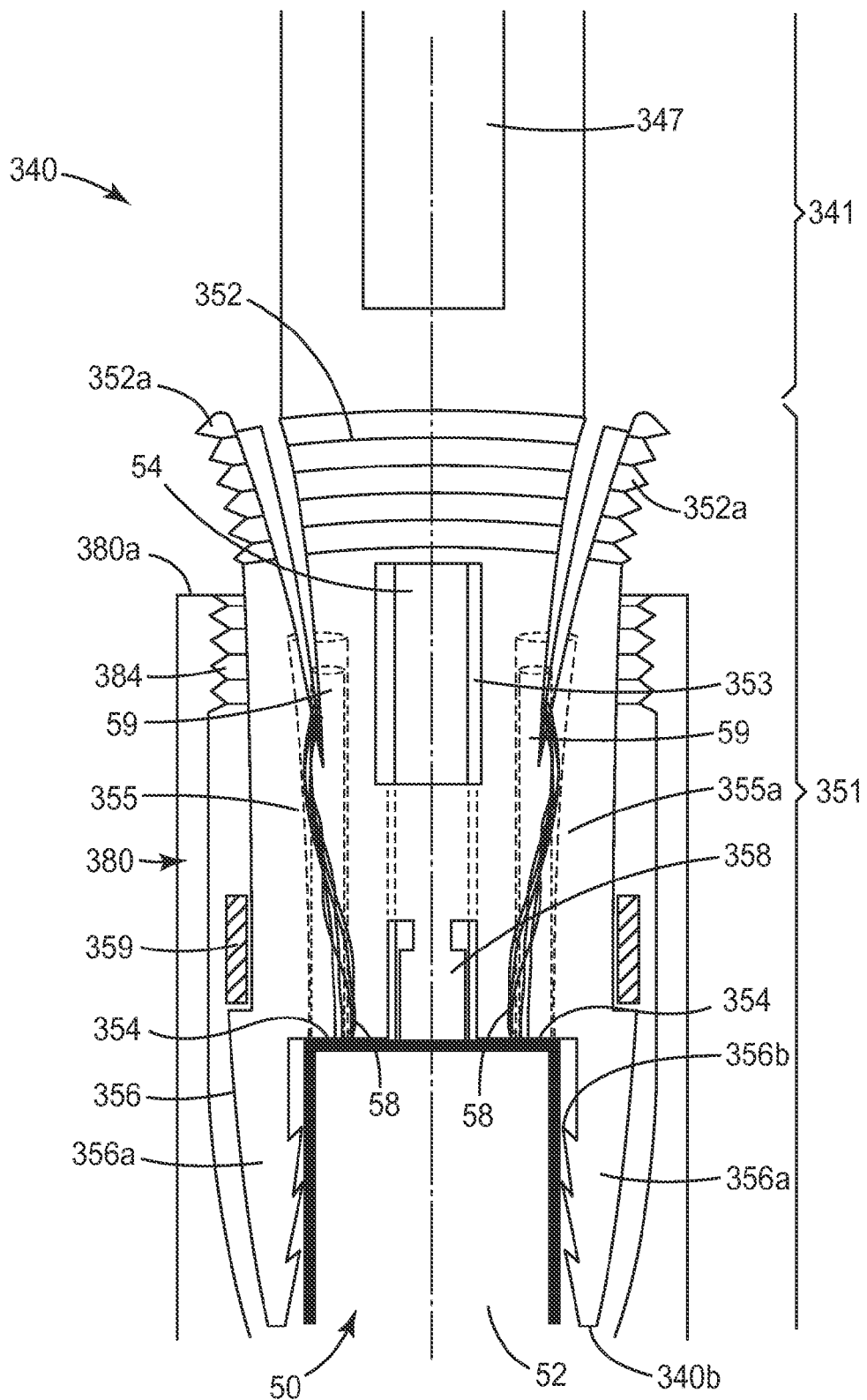
FIG. 7 shows a schematic detail view of a portion of another alternative exemplary backbone of the optical fiber connector according to the current invention.

FIG. 7 is a schematic cross section of a portion of another exemplary backbone 340 and boot 380 that is configured for use with optical fiber drop cables having rod-like strength members. Other key portions of the connector such as the housing, housing and mechanical splice devices are substantially the same as those described previously and so will not be presented here.

Backbone 340 includes a hollow front portion 341 configured to receive the connector collar body and a rear portion 351. The backbone includes an opening (not shown) at a front end to allow for insertion of the collar body (not shown) into the hollow front portion of the backbone. Backbone 340 further includes an access opening 347 through a side wall of the front portion of the backbone, which provides access to actuate a mechanical splice device disposed within the connector collar body that is secured within the front portion of the backbone.

The rear portion 351 of backbone 340 can have comprises a collet-type, split body shape having two collet legs 356a at the second end 340b of the backbone that make up the jacket clamping portion 356 of the connector. The backbone 340 can further include a mounting structure 352 that provides for coupling to the fiber boot 380. In an exemplary aspect, the mounting structure comprises a threaded surface formed on an outer portion of backbone 340 that is configured to engage corresponding threaded grooves 384 disposed inside of the first end 380a of the boot 380. In addition, the mounting structure 352 can provide a retention area for securing the strength members of the optical fiber cable being terminated in the form of cantilevered extensions 352a on opposing sides of the backbone which can be pressed in to capture the strength members 58 of optical fiber cable between the body of the backbone and the cantilevered extensions when the boot is secured over the rear portion of the backbone. Optionally, the exemplary connector can include a compression band 359 that can be pushed forward when the boot is attached to the backbone that is configured to squeeze the strength members of optical fiber cable between the body of the backbone and the cantilevered extensions.

Backbone 340 can further include a ledge or a stop 354 formed on an interior portion thereof to provide a boundary for the insertion of the cable jacket 52 of the optical fiber cable 50 being terminated (as explained in more detail below). In addition, backbone 340 includes a first clamping portion 358 formed in the rear portion of the backbone and a second clamping portion 356 formed at a back end 340b of the backbone.

In an alternative aspect, backbone 340 can include one or more channels 355 extending from the surface of the ledge 354 at one end of the channel and opening into the gap between backbone and the cantilevered extensions 352a. Rod-like strength members 59, such as glass reinforced polymer rods, can be inserted through these channels so that they extend gap between backbone and the cantilevered extensions. The rod-like strength members will be captured between the body of the backbone and the cantilevered extensions when the boot is secured over the rear portion of the backbone. Alternatively, compression band 359 can be pushed forward when the boot is attached to the backbone that is configured to squeeze the rod-like strength members of optical fiber cable between the body of the backbone and the cantilevered extensions.

The first clamping portion is configured to clamp onto the buffer layer 54 of the optical fiber cable 50 using an integrally formed buffer gripping device 358 that can exert a holding pressure on the buffer layer to control the pistoning of the optical fiber out of the optical fiber cable as a result of environmental changes (e.g. temperature, humidity, etc.) which otherwise may increase loss or damage the optical fiber. In an exemplary aspect, the buffer gripping device can be in the form of a pressure foot that can be actuated when the boot is fully attached to the backbone of the connector. In one exemplary aspect, buffer gripping device 358 can be formed of a deformable plastic or elastomer so that when the boot is tightened onto the back ends of the backbone, the buffer gripping device tightly holds the buffer layer of the optical fiber cable.

The second clamping portion 356 is configured to clamp onto the cable jacket 52 of the optical fiber cable 50 being terminated in connector 300. In a preferred aspect, second clamping portion 356 comprises a collet-type, split body shape that is actuated when the boot 380 is secured to mounting structure 352. The second clamping portion can include raised inner surfaces (i.e. ridges, barbs, or teeth 356b) to permit ready clamping of the cable jacket 52. In an exemplary aspect, the raised inner surfaces of the second clamping portion can be angled so that they will bite in harder to a cable being pulled out of the exemplary connector. In addition, the second clamping portion 356 also can provide a guide structure when inserting fiber cable 50 during the termination process. Thus, boot can be utilized to clamp the fiber strength members 58 and the cable jacket 52.

Figure 8:
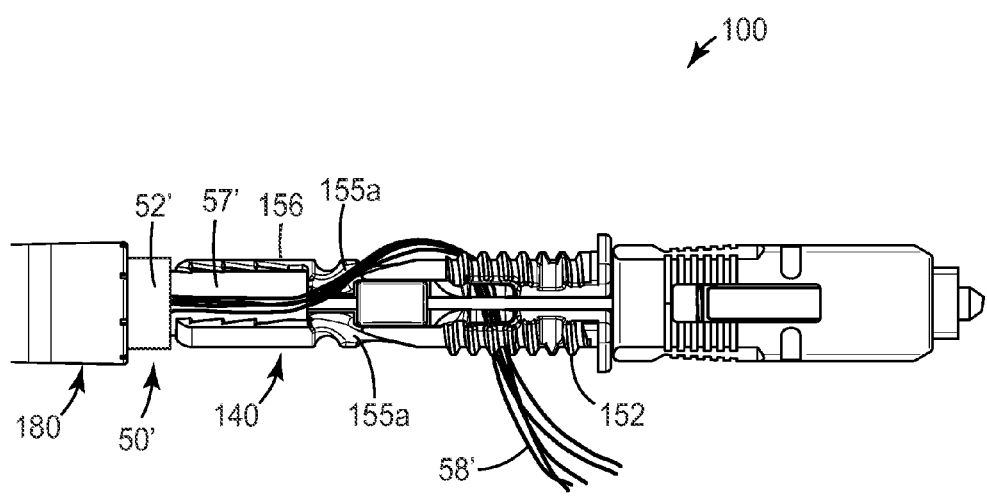
FIG. 8 is a top view of the exemplary connector of FIGS. 1A and 1B showing its use with larger diameter drop cable.

In an exemplary aspect, Connector 100 can be used to terminate oversized, irregular or larger diameter drop cables (i.e. drop cables having an external diameter >5 mm) as illustrated in FIG. 8. For example, tight or semi-tight buffered drop cables having an external diameter greater than 5 mm can be terminated using connector 100 so long as the buffer tube is less than about 5.0 mm in diameter. In this exemplary aspect, the outer jacket layer 52' can be cut back to allow the second clamping portion 156 of backbone 140 to clamp onto an intermediate jacket layer or buffer tube 57' instead of the outer jacket layer when boot 180 is secured to mounting structure 152. The remainder of the termination procedure is analogous to that which has been described previously including the placement of at least a portion of the strength members 58' in first guide channels 155a and wrapping around the rear portion of the backbone. In another exemplary aspect, an over jacketed 2×3 FRP cable can be terminated using connector 100 in a similar manner to that shown in FIG. 8 where the over jacket layer is removed such that the second clamping portion of the backbone clamps onto the rectangular jacket of the FRP cable itself.

Figure 9B:
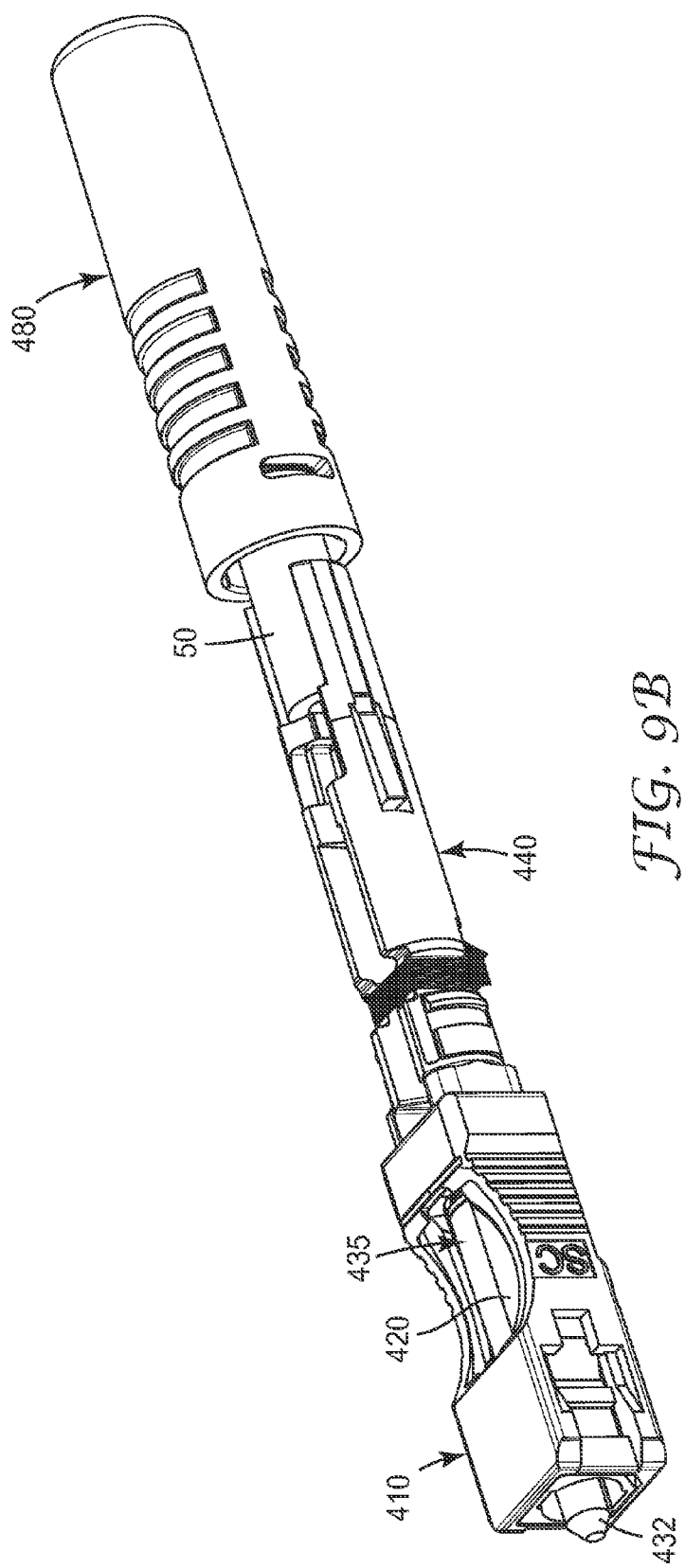

According to an exemplary embodiment of the present invention, an optical fiber connector 400 is shown in isometric assembled view in FIG. 9A and a partially exploded isometric view in FIG. 9B. Optical connector 400 is configured to mate with a receptacle of a corresponding format. However, as would be apparent to one of ordinary skill in the art given the present description, optical connectors having other standard formats, such as ST, FC, and LC connector formats, can also be provided.

Optical fiber connector 400 can include a connector body having a housing 410 having an outer shell configured to be received in an SC receptacle (e.g., an SC coupling, an SC adapter, or an SC socket). As mentioned previously, the exemplary connector can be modified to have other standard formats, such as ST, FC, and LC connector formats and connectors that have been modified to alter the connection format are considered within the scope of the present disclosure.

Connector 400 also includes a collar body 420 that hold and aligns a ceramic ferrule with a mechanical splice device 435, a multi-purpose backbone 440 that retains the collar body 420 within the connector, and a boot 480. In one aspect, connector 400 can be utilized to field terminate optical fiber cable 50, while in an alternative aspect, the exemplary connector can be factory terminated onto the terminal end of optical fiber cable 50. Collar body 420 is essentially the same as collar body 120, thus collar body 420 (including the ferrule and splice device 435) will not be described in detail hereafter, but rather will only be referred to as needed to understand the new backbone and boot structures of connector 400.

In one aspect, the backbone 440 (see e.g., FIGS. 10A-10E) provides structural support for the connector 400. The backbone 440 is an elongated hollow structure extending from a front end 440a to a back end 440b having a length of from about 50 mm to about 60 mm that provides two separate clamping portions in addition to the mechanical splice device 435, which clamps on the bare glass portion of the optical fiber, to secure exemplary connector 400 onto the terminal end of an optical fiber cable. Moreover, the backbone 440 can provide further axial strain relief by securing the strength members of the optical fiber cable being terminated.

Backbone 440 includes a hollow front portion 441 configured to receive the connector collar body and a rear portion 451. The backbone includes an opening 441a at a front end 440a to allow for insertion of the collar body 420 into the hollow front portion of the backbone. Backbone 440 further includes an access opening 447 through a side wall of the front portion of the backbone, which provides access to actuate a mechanical splice device 435 disposed within the connector collar body that is secured within the front portion of the backbone. In a preferred aspect, as is shown in FIGS. 3A and 3B, access opening 447 can have a cut-out or shallow depression formed on the sides to accommodate a user's thumb or finger during actuation of the splice device. The backbone 440 has an axial bore throughout to permit passage of the optical fiber being terminated.

The rear portion 451 of backbone 440 can have a collet-type, split body shape having two collet legs at the second end of the backbone. The backbone 440 can further include mounting structures 452 that provides for coupling to the fiber boot 480. In an exemplary aspect, the mounting structure comprises a pair of cantilevered latch arms that are configured to engage corresponding slots disposed near the first end 480a of the boot 480. Barbed or hooked portions of the cantilevered latch arms engage with the slots in the boot to secure the boot over the rear portion of the backbone during the final step of the optical fiber cable termination process. This exemplary securing mechanism will not exert any torsional forces on the cable when the boot is mounted onto the rear portion of the backbone, because the boot can be slid forward over the rear portion of the backbone with a clean linear movement.

The backbone 440 includes a collar body mount structure, as described previously. The collar mount structure is configured to receive and secure the collar body 420 within the backbone. In addition, backbone 440 includes a fiber guide 453 formed in the interior of rear portion 451 therein to provide axial alignment support for the optical fiber cable being terminated and can further include one or more stops 454 formed on an interior portion thereof to provide a boundary for the insertion of the cable jacket 52 of the optical fiber cable 50 being terminated (as explained in more detail below).

In an exemplary aspect, backbone 440 includes a first clamping portion 458 formed in the rear portion 451 of the backbone and a second clamping portion 456 formed at a back end 440b of the backbone. The first clamping portion 458 can be configured to clamp onto an intermediate jacket layer or a buffer layer 54 of the optical fiber cable 50 using a buffer gripping device in the form of a cantilevered pressure foot 458a. The first clamping portion or buffer clamp grips the intermediate jacket layer or the buffer layer to control the pistoning of the optical fiber out of the optical fiber cable as a result of environmental changes (e.g. temperature, humidity, etc.) which otherwise may increase loss or in the worst case break the optical fiber.

In the exemplary aspect, backbone 440 includes two cantilevered pressure feet 458a disposed on opposite sides of the backbone. The cantilevered pressure feet can be integrally formed with the backbone so that the pivot point 458b of the cantilevered pressure feet is disposed closer to the rear end 440b of the backbone and the free end 458c of cantilevered pressure feet is disposed adjacent to bow channel 459, as shown in FIGS. 10A-10E. The cantilevered pressure feet of the first clamping portion can be actuated by raised activation cams 487 disposed within the interior of boot 480 (refer to FIGS. 11B-11C and FIG. 13B). The activation cams exert an inward pressure on the cantilevered pressure feet so that the cantilevered pressure feet securely grip the intermediate jacket layer or buffer layer of the optical fiber cable being terminated.

Figure 14A:
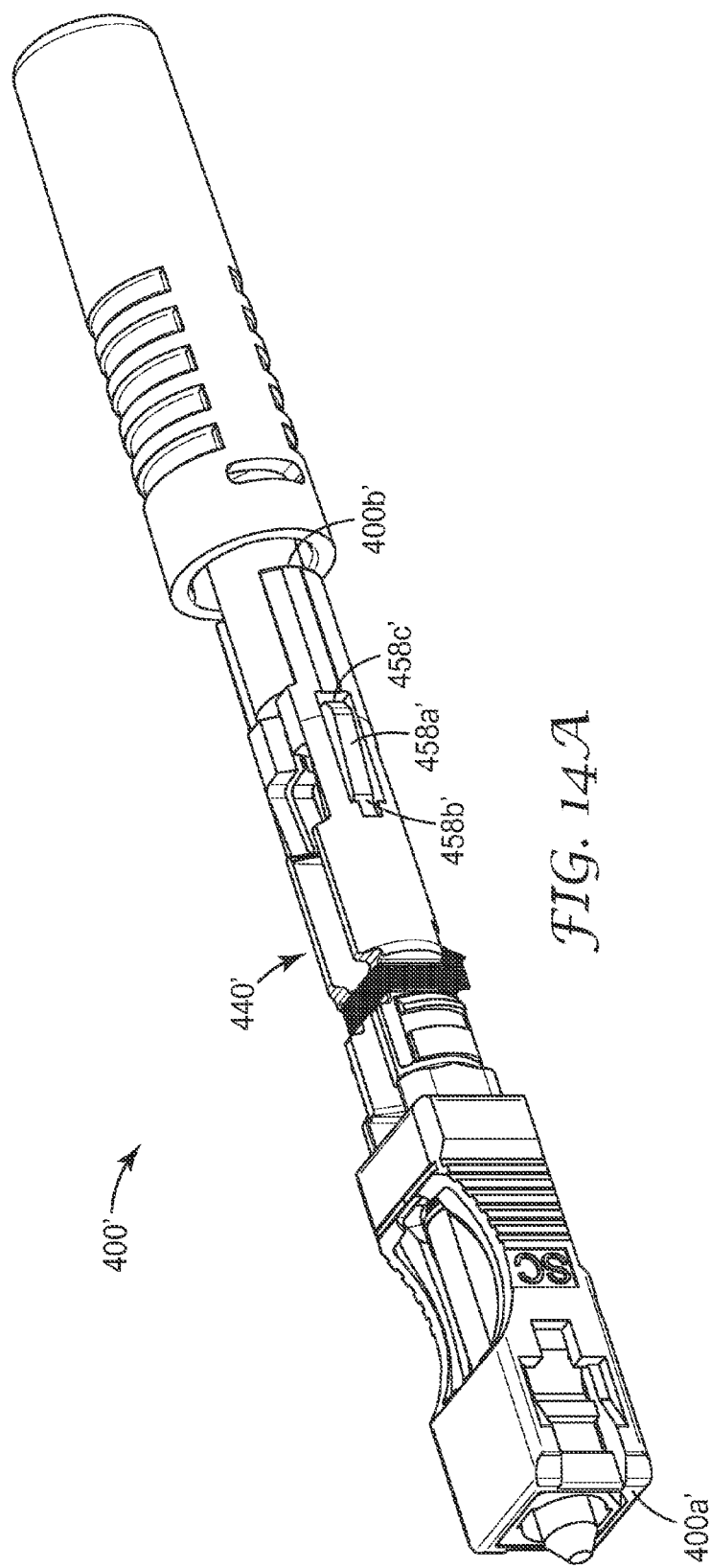
FIGS. 14A and 14B are two views of another optical fiber connector according to an embodiment of the present invention.
Figure 14B:
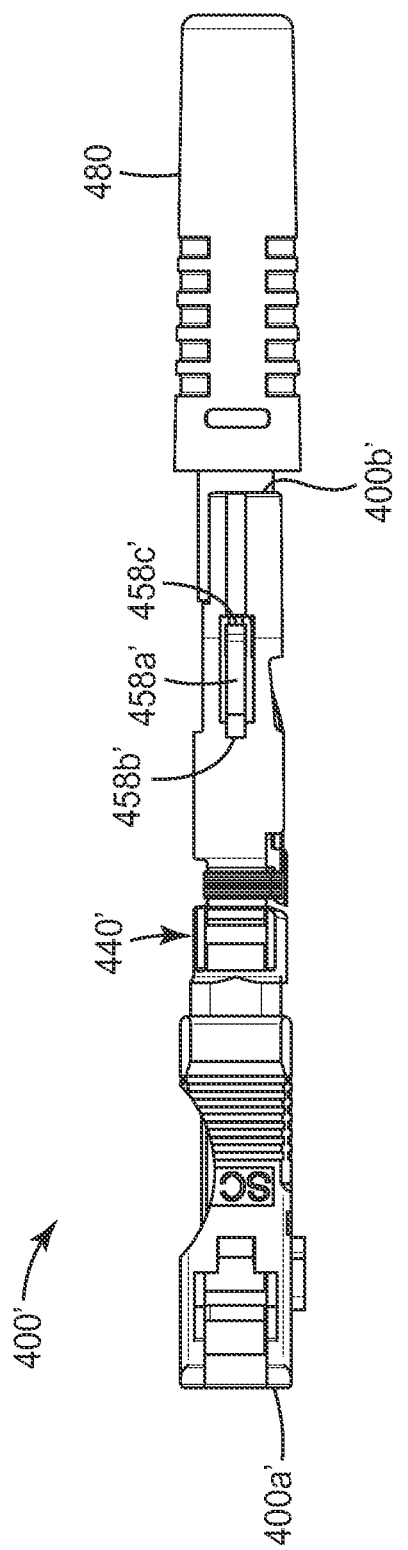

In an alternative aspect, the cantilevered pressure feet 458a' of the first clamping portion of the backbone 440' can be integrally formed with the backbone so that the pivot point 458b' of the cantilevered pressure feet is disposed closer to the front end 400a' of connector 400' and the free end 458c' of cantilevered pressure feet is disposed closer to the back end 400b' of the connector, as shown in FIGS. 14A and 14B.

Figure 10A:
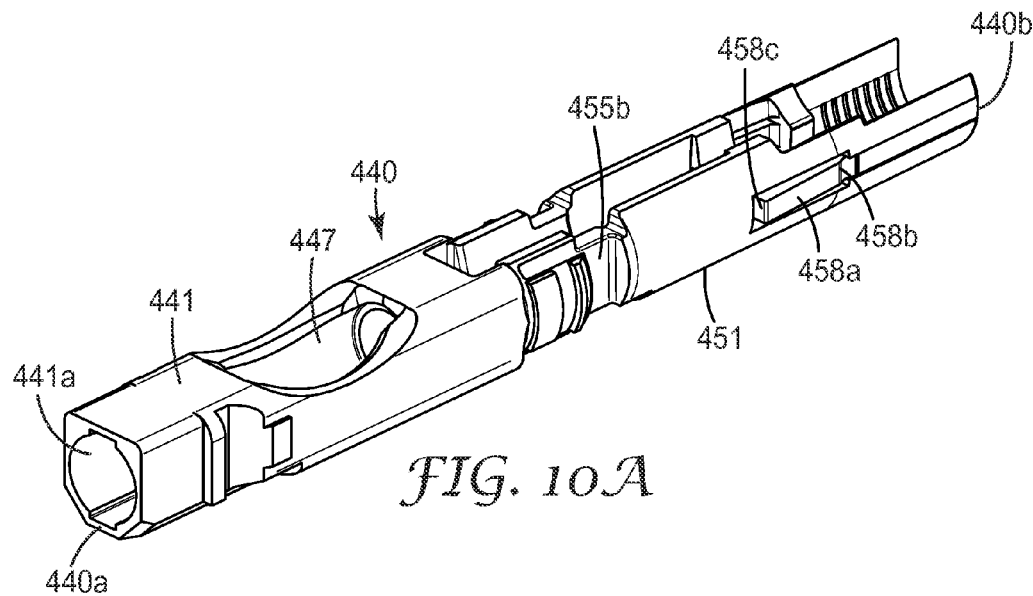
FIGS. 10A-10E are five views of an exemplary backbone of the optical fiber connector of FIGS. 9A-9B.
Figure 10B:
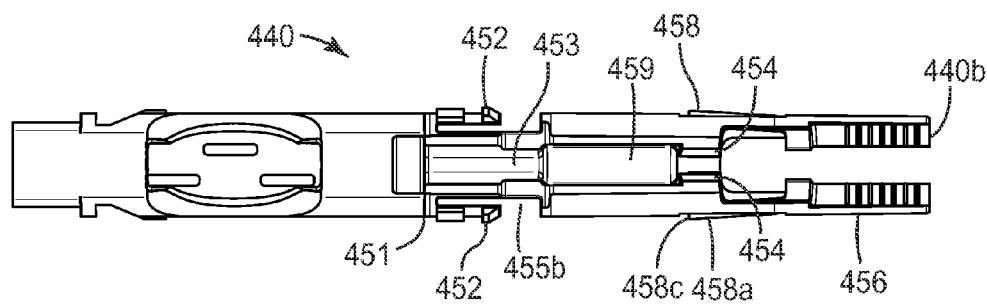
Figure 10C:
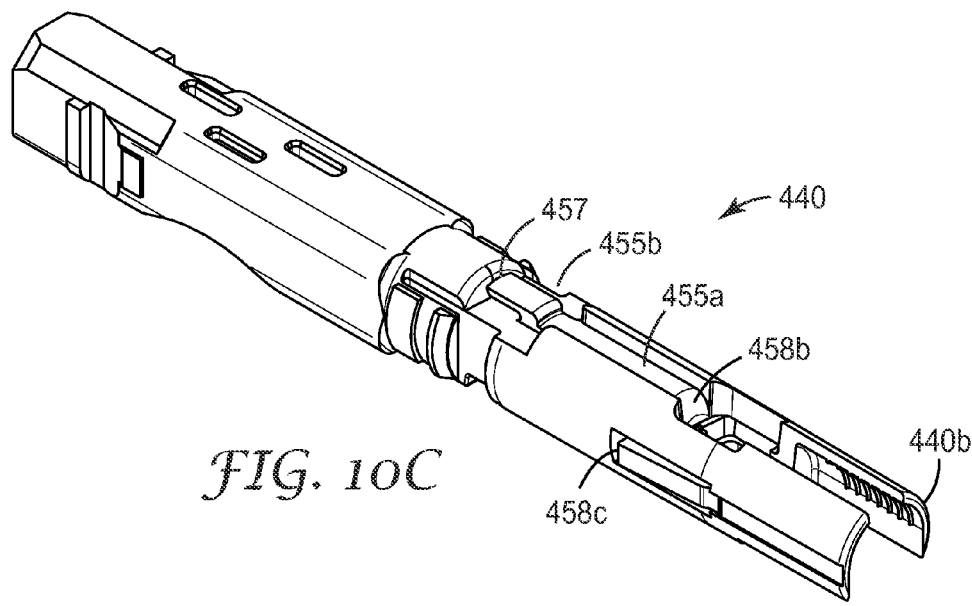
Figure 10D:
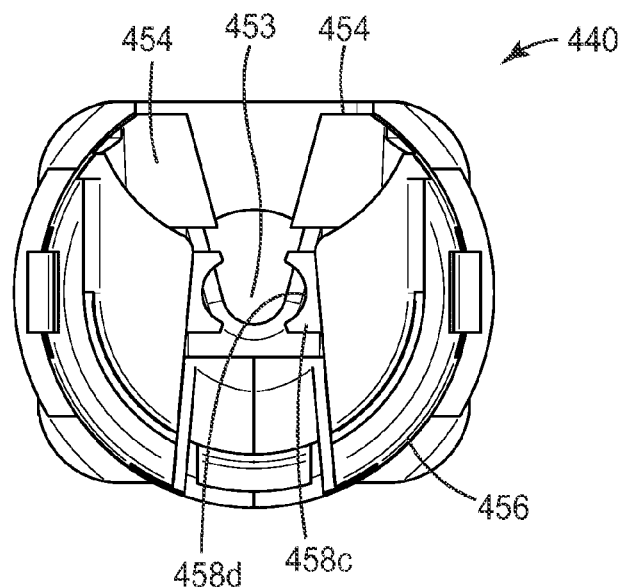
Figure 10E:
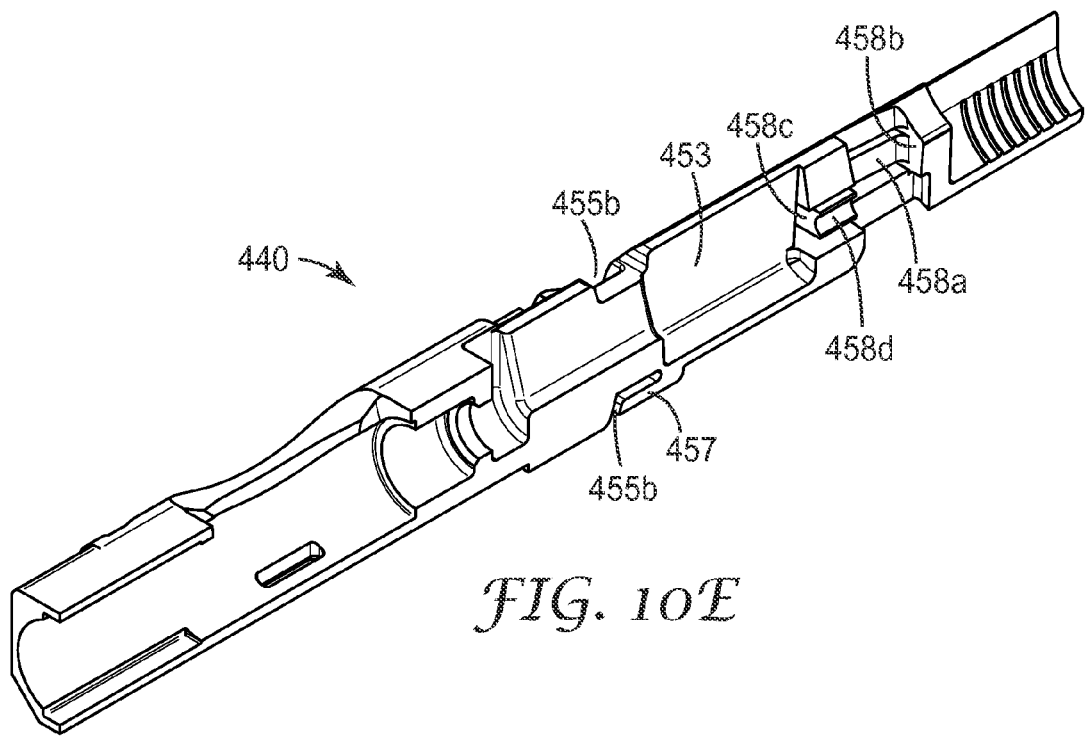
Figure 11A:
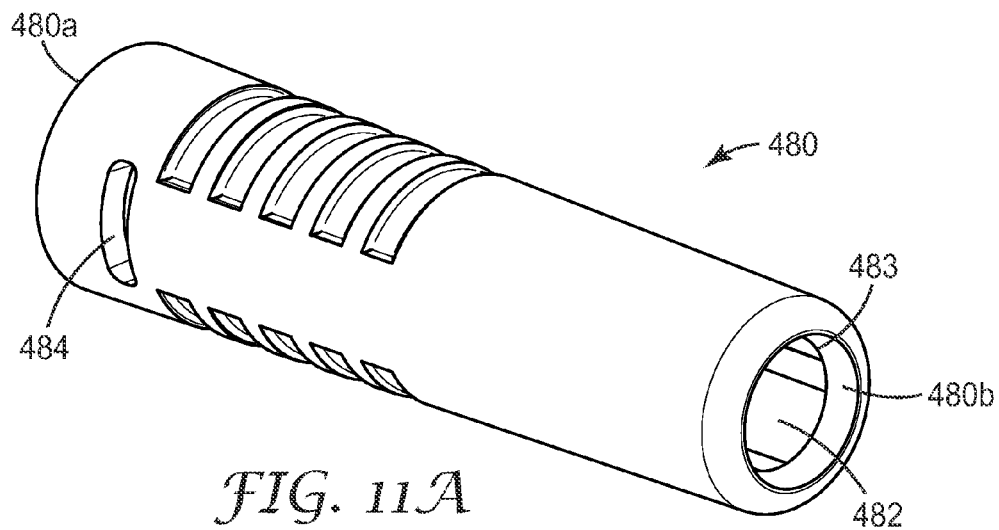
FIGS. 11A-11C are three views of an exemplary boot of the optical fiber connector of FIGS. 9A-9B.
Figure 11B:
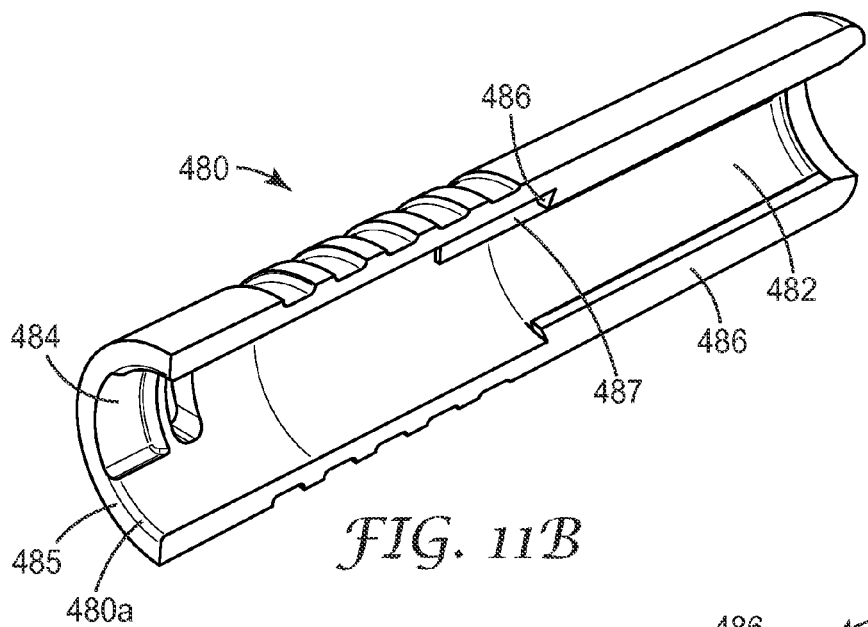
Figure 11C:
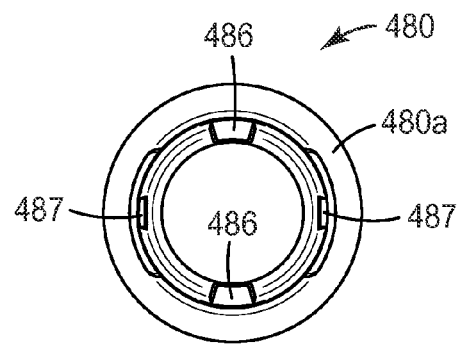
Figure 12:
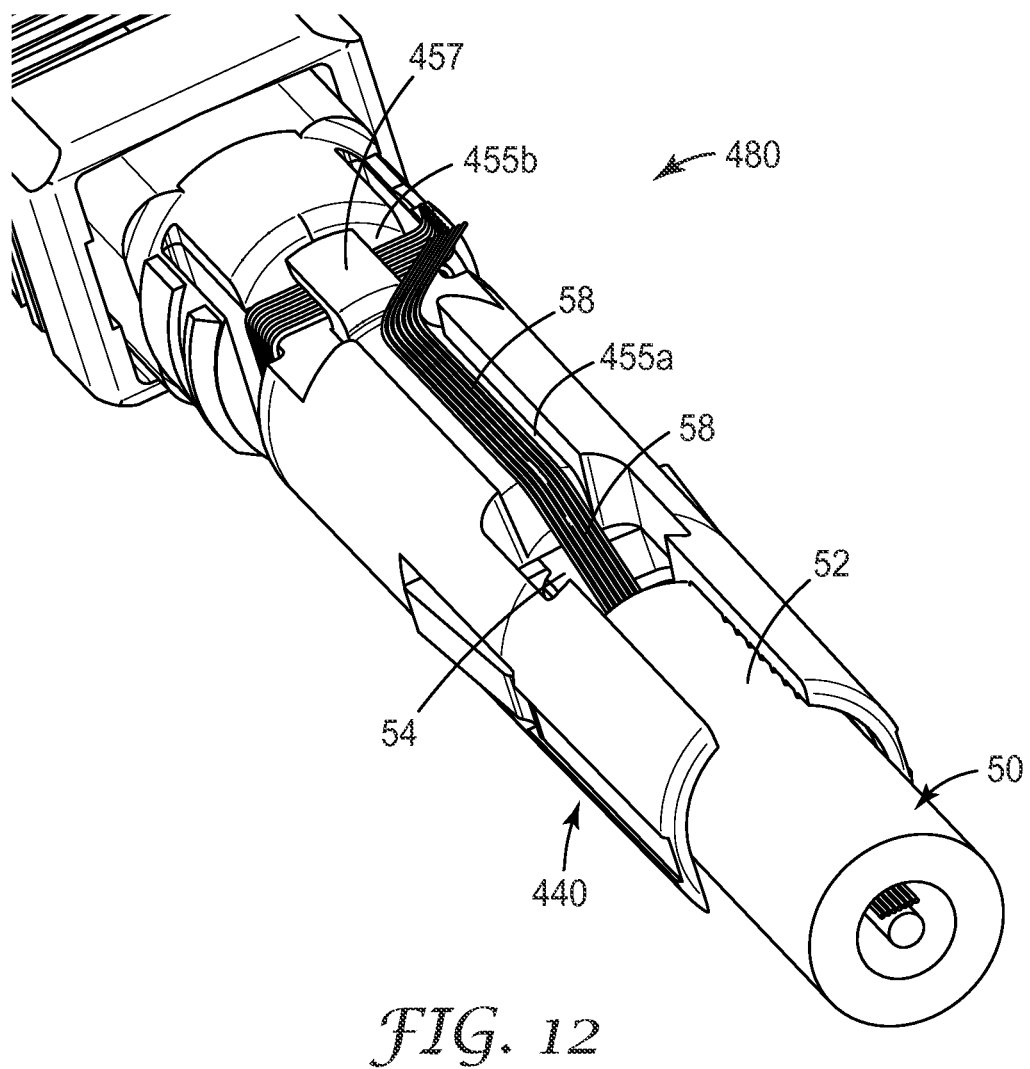
FIG. 12 illustrates how strength members of a jacketed optical fiber cable can be wrapped around the exemplary backbone of FIGS. 10A-10E during the optical fiber cable termination process.
Figure 13A:
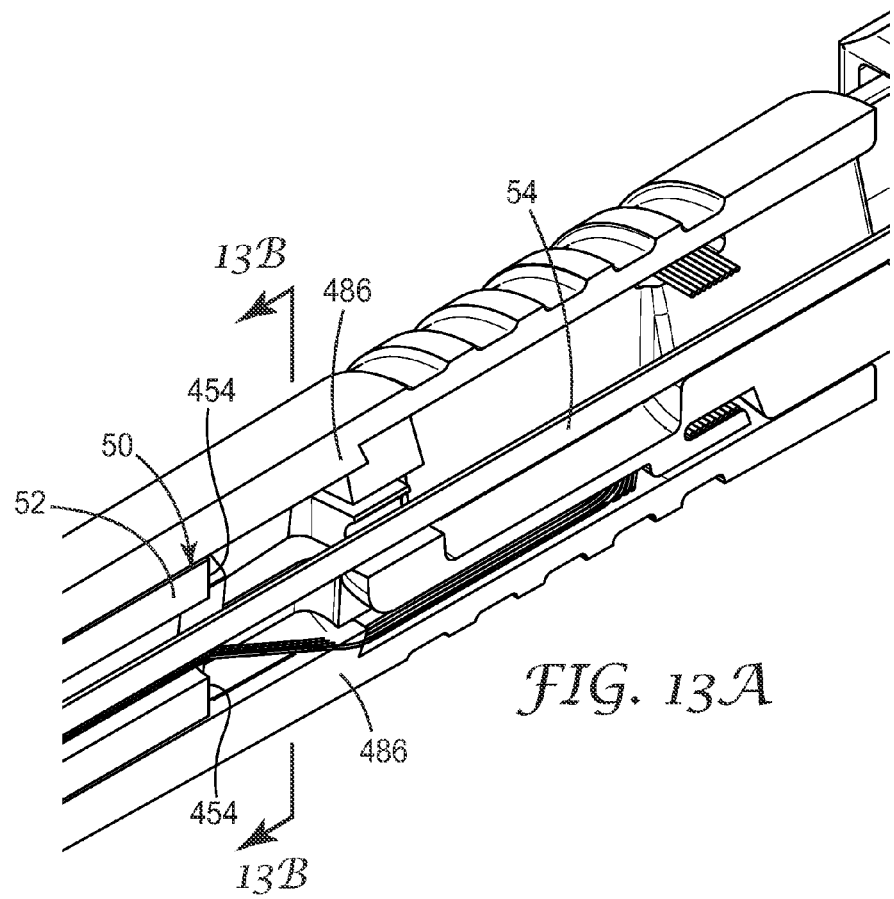
FIGS. 13A and 13B illustrates how the boot of FIGS. 11A-11C interacts with the exemplary backbone of FIGS. 10A-10E after termination of the exemplary optical fiber connector.
Figure 13B:
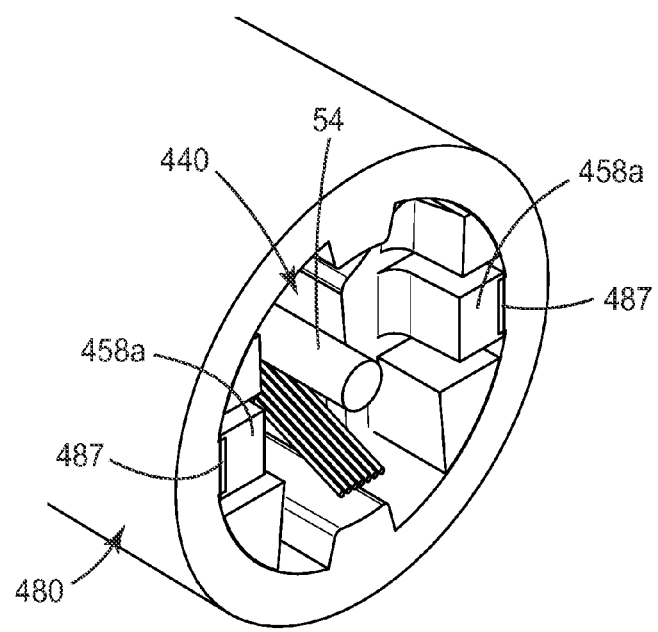

In an exemplary aspect, the surface 458d that will contact the intermediate jacket layer or buffer layer of the optical fiber cable can be sculpted to conform to the shape of the intermediate jacket layer or buffer layer as shown in FIGS. 10E and 13B where the contact surface includes a semi-cylindrical depression to conform to a intermediate jacket layer or buffer layer of the optical fiber cable having a cylindrical external profile. Alternatively, the contact surface can include a rectangular sculpted depression which would conform to the intermediate jacket layer in an over jacket FRP cable construction. In another alternative aspect, the contact surface can include either teeth or barbs that bite into the surface of the intermediate jacket layer or buffer layer of the optical fiber cable to provide enhanced gripping of the intermediate jacket layer or buffer layer.

The second clamping portion 456 is configured to clamp onto the cable jacket 52 of the optical fiber cable 50 being terminated in connector 400, as described previously with respect to the connector 100. In a preferred aspect, second clamping portion 456 comprises a collet-type, split body shape that is actuated when the boot 480 is secured to mounting structure 452. For example, boot 480 includes a tapered interior cavity that is wider at the first end 480a of the boot and narrower at the second end 480b of the boot. As the boot is secured onto the mounting structure 452 of the backbone, the axial movement of the boot relative to the backbone forces the legs 456a of the second clamping portion 456 to move radially inwards so that the cable jacket is tightly gripped in the second clamping portion 456 of the backbone and the free end of the cantilevered pressure feet of the first clamping portion 458 are pressed radially inward by the sloped activation cams within the interior of the boot to tightly hold onto the intermediate buffer layer of optical fiber cable. The second clamping portion can include raised inner surfaces (i.e. ridges, barbs, or teeth) to permit ready clamping of the cable jacket 52. In an exemplary aspect, the raised inner surfaces of the second clamping portion can be angled so that they will bite in harder to a cable being pulled out of the exemplary connector.

In an exemplary aspect, backbone 440 further includes enhanced means for securing the strength members 58 of an optical fiber cable 50 within connector 100 improving the strain relief and pull resistance of the connector. Specifically, the backbone includes first guide channel 455a formed on the bottom side of the rear portion 451 opposite the open fiber guide 453 and bow channel 459 of the backbone and between the mounting structure 452 and the second clamping portion 456 and a second guide channel 455b disposed within mounting structure 452 transverse, to the longitudinal axis of the backbone to facilitate wrapping at least a portion of the strength members around the rear portion of the backbone. Optionally, the backbone can have a hook 457 disposed on the backbone disposed over the second guide channel and in line with the first guide channel to further aid in placement of the strength members as they are wrapped around the backbone. Hook 457 can be useful in guiding the fibers as they change from running longitudinally along the backbone in the first guide channel to wrapping around the backbone in the second guide channel 455b. Additional strength members can be routed longitudinally along the top side o the backbone through bow channel 459 and fiber guide 453 before wrapping around the backbone in the second guide channel 455b. The wrapped strength members are secured to the backbone when the boot is attached to the mounting structure. The strength members are trapped between the backbone and internal ribs 486 in boot 480 as shown in FIGS. 13A and 13B. The wrapping of the strength members prevents the slippage of the optical fiber within the connector due to an external pulling force on the cable.

According to an exemplary embodiment of the present invention, housing 410, collar body 420, and backbone 440 can be formed or molded from a polymer material, although metal and other suitably rigid materials can also be utilized. For example, one exemplary material can comprise a fiberglass reinforced polyphenylene sulfide resin. Housing 410 is preferably secured to an outer surface of backbone 440 via snap fit.

As mentioned above, fiber boot 480 can be utilized for several purposes with optical connector 400. As shown in FIGS. 11A-11C and FIGS. 13A-13B, boot 480 includes a tapered body having an axial bore 482 throughout. The boot 480 includes slots 484, where the slots are configured to engage with the correspondingly mounting structure 452 (i.e. cantilevered latches) of the backbone 440. In addition, the axial length of boot 480 is configured such that a rear end 480b of the boot, which has a smaller opening 483 than at front opening 485, engages the jacket clamp portion 456 of the backbone. For example, as is explained in more detail below, as the boot 480 is secured onto the mounting structure 452 of the backbone, the axial movement of the boot relative to the backbone forces the legs of clamp portion 456 to move radially inwards so that the cable jacket 52 is tightly gripped in the second clamping portion 454 of the backbone and the buffer gripping device 458 is squeezed by the activation cams 487 of the boot to tightly hold onto the buffer layer of optical fiber cable 50 in the first clamping portion.

In an exemplary aspect, boot 480 is formed from a rigid material. For example, one exemplary material can comprise a fiberglass reinforced polyphenylene sulfide resin or a polyether imide resin, such as an ULTEM material (available from SABIC). In another aspect, the materials used to form the boot 480 and the backbone 440 are the same.

While the above termination processes are described with respect to the exemplary jacketed round optical fiber cable, the termination processes described herein can be utilized with jacketed optical fiber cables of other sizes and shapes. Furthermore, the termination processes described herein can be utilized with optical connectors that connect single or multiple optical fibers. Also, the termination processes described herein can be utilized to form a restoration splice or with optical connectors that do not incorporate a fiber stub. In addition, the termination processes described herein can be utilized with or without a termination tool or platform to hold the optical connector during the termination process.

Thus, the above termination procedure can be accomplished in the field and allow for optimal axial pre-loading of the fiber into the splice device with reduced bow forces as the cable jacket can be displaced from the terminal end of the field fiber. In addition, the use of an axially displaceable cable jacket band allows the installer to organize the fiber and strength members during the final stages of assembly by sliding the cable jacket band towards the end of the field fiber and provides a more robust assembly. The optical connector is re-usable in that the actuating cap can be removed and the above steps can be repeated.

In another exemplary embodiment of an optical fiber connector for terminating a jacketed optical fiber cable, the optical fiber connector includes a housing configured to mate with a receptacle, a collar body disposed in the housing, a backbone to retain the collar body within the housing, and a press-on boot attachable to a portion of the backbone. The collar body includes a fiber stub mounted in a ferrule at a first end portion of the collar body and a mechanical splice device disposed within the collar body. The fiber stub has a first end proximate to an end face of the ferrule and a second end, such that the mechanical splice device is configured to splice the second end of the fiber stub to an optical fiber from the jacketed optical fiber cable. The backbone includes at least one guide channel to secure strength members of an optical fiber cable and a pair of cantilevered latches that engage with slots formed in the press-on boot to secure the press-on boot to the backbone. The press-on boot actuates the cable jacket clamping portion of the backbone upon attachment to the backbone.

In an exemplary aspect, the backbone can include first guide channels formed in the rear portion of the backbone between a mounting structure and the cable jacket clamping portion and a second guide channel formed in the mounting structure transverse to the backbone to facilitate wrapping the strength members around the rear portion of the backbone. These guide channels can facilitate wrapping of the strength members of an optical fiber cable around a rear portion of the backbone. In addition, the backbone can further include a hook disposed on the backbone to further aid in placement of the strength members as they are wrapped around the backbone. The backbone can further include a buffer gripping device disposed between a mounting structure and the cable jacket clamping portion that is configured to clamp onto a buffer layer of the optical fiber cable.

According to yet another embodiment of an optical fiber connector for terminating a jacketed optical fiber cable, the optical fiber connector includes a housing configured to mate with a receptacle, a ferruled collar assembly disposed in the housing to secure a bare glass portion of the optical fiber within the optical fiber connector, a backbone to retain the ferruled collar within the housing, and a press-on boot attachable to a portion of the backbone. The backbone includes at least one guide channel to secure strength members of an optical fiber cable and a pair of cantilevered latches that engage with slots formed in the press-on boot to secure the press-on boot to the backbone. The press-on boot actuates the cable jacket clamping portion of the backbone upon attachment to the backbone. The ferruled collar assembly includes a collar body and a ferrule disposed in a first end portion of the collar body.

The bare glass portion of the optical fiber can be secured in the ferruled assembly by a mechanical splice device, a mechanical gripping device or by an adhesive. For example, in optical fiber connectors having a fiber stub mounted in the ferrule wherein the fiber stub has a first end proximate to an end face of the ferrule and a second end, the mechanical splice device disposed in the collar body can be configured to splice the second end of the fiber stub to bare glass portion of the optical fiber from the jacketed optical fiber cable. Alternatively, a mechanical gripping device can be used to secure the bare glass portion of the optical fiber wherein the exemplary optical fiber connector is a remote grip optical fiber connector. In another exemplary aspect, an adhesive, such as a thermally cured epoxy or UV curable structural adhesive, can be used to secure the bare glass portion of the optical fiber in the ferrule, in the collar body or in a combination of the ferrule and the collar body.

In an exemplary aspect, the backbone can include first guide channels formed in the rear portion of the backbone between a mounting structure and the cable jacket clamping portion and a second guide channel formed in the mounting structure transverse to the backbone to facilitate wrapping the strength members around the rear portion of the backbone. These guide channels can facilitate wrapping of the strength members of an optical fiber cable around a rear portion of the backbone. In addition, the backbone can further include a hook disposed on the backbone to further aid in placement of the strength members as they are wrapped around the backbone. The backbone can further include a buffer gripping device disposed between a mounting structure and the cable jacket clamping portion that is configured to clamp onto a buffer layer of the optical fiber cable.

The optical connectors described above can be used in many conventional optical connector applications such as drop cables and/or jumpers. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications.

As mentioned above, the optical connector of the exemplary embodiments is of compact length and is capable of straightforward field termination. Such exemplary connectors can be readily installed and utilized for FTTP and/or FTTX network installations.

Various modifications, equivalent processes, as well as numerous structures to which the present invention may be applicable will be readily apparent to those of skill in the art to which the present invention is directed upon review of the present specification.

We claim:

1. An optical fiber connector for terminating a jacketed optical fiber cable, comprising:
   a housing configured to mate with a receptacle;
   a collar body disposed in the housing, wherein the collar body includes a fiber stub disposed in a first end portion of the collar body, the fiber stub being mounted in a ferrule and having a first end proximate to an end face of the ferrule and a second end, wherein the collar body further includes a mechanical splice device disposed in a portion of the collar body, the mechanical splice device configured to splice the second end of the fiber stub to an optical fiber from the jacketed optical fiber cable;
   a backbone to retain the collar body within the housing, the backbone including at least one guide channel to facilitate wrapping strength members of an optical fiber cable around a rear portion of the backbone and a cable jacket clamping portion to clamp a cable jacket that surrounds a portion of the optical fiber, wherein the backbone further comprises a hook disposed on the backbone to further aid in placement of the strength members as they are wrapped around the backbone; and
   a boot attachable to a portion of the backbone, wherein the boot actuates the cable jacket clamping portion of the backbone upon attachment to the backbone.

2. An optical fiber connector for terminating a jacketed optical fiber cable, comprising:
   a housing configured to mate with a receptacle;
   a ferruled collar assembly comprising a collar body and a ferrule disposed in a first end portion of the collar body disposed in the housing, wherein a bare glass portion of the optical fiber is secured to the optical fiber connector within the ferruled collar assembly;
   a backbone to retain the collar body within the housing, the backbone includes at least one guide channel to secure strength members of an optical fiber cable and a pair of cantilevered latches; and
   a press-on boot attachable to a portion of the backbone, wherein the boot actuates a cable jacket clamping portion of the backbone upon attachment to the backbone,
   wherein the boot is secured to the backbone by the pair of cantilevered latches disposed on the backbone that engage with slots formed in the boot.

3. The optical fiber connector of claim 2, wherein the connector further comprises a mechanical splice device disposed in a portion of the collar body and a fiber stub mounted in the ferrule and having a first end proximate to an end face of the ferrule and a second end, and wherein the mechanical splice device configured to splice the second end of the fiber stub to an optical fiber from the jacketed optical fiber cable.

4. The optical fiber connector of claim 2, wherein the connector further comprises a mechanical gripping device disposed in a portion of the collar body to the bare glass portion of the optical fiber in the optical fiber connector.

5. The optical fiber connector of claim 2, wherein the bare glass portion of the optical fiber is secured in the ferrule by an adhesive.

6. The optical fiber connector of claim 2, wherein the bare glass portion of the optical fiber is secured in the collar body by an adhesive.

7. The optical fiber connector of claim 2, wherein the at least one guide channel facilitates wrapping strength members of an optical fiber cable around a rear portion of the backbone.

8. The optical fiber connector of claim 2, wherein the backbone comprises first guide channels formed in the rear portion of the backbone between a mounting structure and the cable jacket clamping portion and a second guide channel formed in the mounting structure transverse to the backbone to facilitate wrapping the strength members around the rear portion of the backbone.

9. The optical fiber connector of claim 2, wherein the backbone further comprises a hook disposed on the backbone to further aid in placement of the strength members as they are wrapped around the backbone.

10. The optical fiber connector of claim 2, wherein the boot retains the strength members of the optical fiber that are wrapped around the backbone are disposed between the backbone and the boot.

11. The optical fiber connector of claim 2, wherein the backbone further comprises a buffer gripping device disposed between a mounting structure and the cable jacket clamping portion that is configured to clamp onto a buffer layer of the optical fiber cable.

12. The optical fiber connector of claim 2, wherein the cable jacket clamping portion comprises a collet-type, split body shape.

13. The optical fiber connector of claim 1, wherein the boot is a press on boot and wherein the boot is secured to the backbone by a pair of cantilevered latches disposed on the backbone that engage with slots formed in the boot.

14. The optical fiber connector of claim 1, wherein the boot attaches to the backbone by a screw-type mechanism.

15. The optical fiber connector of claim 1, wherein the backbone further comprises a buffer gripping device disposed between a mounting structure and the cable jacket clamping portion that is configured to clamp onto a buffer layer of the optical fiber cable.

16. The optical fiber connector of claim 1, wherein the cable jacket clamping portion comprises a collet-type, split body shape.

17. The optical fiber connector of claim 1, wherein the boot retains the strength members of the optical fiber that are wrapped around the backbone are disposed between the backbone and the boot.

18. The optical fiber connector of claim 1, wherein the at least one guide channel facilitates wrapping strength members of an optical fiber cable around a rear portion of the backbone.

19. The optical fiber connector of claim 1, wherein the backbone comprises first guide channels formed in the rear portion of the backbone between a mounting structure and the cable jacket clamping portion and a second guide channel formed in the mounting structure transverse to the backbone to facilitate wrapping the strength members around the rear portion of the backbone.

* * * * *